US012287605B2

(12) United States Patent
Kamada et al.

(10) Patent No.: US 12,287,605 B2
(45) Date of Patent: Apr. 29, 2025

(54) TONER AND PRODUCTION METHOD THEREOF, TONER STORED UNIT, IMAGE FORMING APPARATUS, AND IMAGE FORMING METHOD

(71) Applicant: RICOH COMPANY, LTD., Tokyo (JP)

(72) Inventors: Yasuo Kamada, Shizuoka (JP); Hiroshi Yamada, Shizuoka (JP); Akinori Saitoh, Shizuoka (JP); Akio Takei, Shizuoka (JP); Toma Takebayashi, Shizuoka (JP); Masahiro Yukikawa, Kanagawa (JP)

(73) Assignee: Ricoh Technology, Ltd., Tokyo (JP)

( * ) Notice: Subject to any disclaimer, the term of this patent is extended or adjusted under 35 U.S.C. 154(b) by 662 days.

(21) Appl. No.: 17/318,396

(22) Filed: May 12, 2021

(65) Prior Publication Data

US 2021/0356877 A1 Nov. 18, 2021

(30) Foreign Application Priority Data

May 18, 2020 (JP) ................................ 2020-086612

(51) Int. Cl.

| | |
|---|---|
| ***G03G 9/08*** | (2006.01) |
| ***G03G 9/097*** | (2006.01) |
| ***G03G 15/08*** | (2006.01) |

(52) U.S. Cl.

CPC ......... *G03G 9/0825* (2013.01); *G03G 9/0802* (2013.01); *G03G 9/09733* (2013.01); *G03G 15/0865* (2013.01)

(58) Field of Classification Search

None

See application file for complete search history.

(56) References Cited

U.S. PATENT DOCUMENTS

| | | | | |
|---|---|---|---|---|
| 2,297,691 | A * | 10/1942 | Carlson | G03G 9/08 399/314 |
| 5,906,704 | A | 5/1999 | Matsuura et al. | |
| 2003/0027070 | A1* | 2/2003 | Niwa | G03G 9/08795 430/108.22 |
| 2005/0130050 | A1* | 6/2005 | Takada | G03G 9/097 430/108.1 |
| 2015/0261113 | A1* | 9/2015 | Takeyama | G03G 9/08797 430/105 |

(Continued)

FOREIGN PATENT DOCUMENTS

| | | |
|---|---|---|
| JP | 2002-284881 | 10/2002 |
| JP | 2002284881 A * | 10/2002 |

(Continued)

OTHER PUBLICATIONS

JP-2002284881-A Translation (Year: 2023).*

(Continued)

*Primary Examiner* — Peter L Vajda
*Assistant Examiner* — Charles Collins Sullivan, IV
(74) *Attorney, Agent, or Firm* — Grüneberg and Myers PLLC

(57) ABSTRACT

A toner includes toner base particles each including: a binder resin, a colorant, and wax; and resin particles on surfaces of the toner base particles. A standard deviation of a distance between the resin particles next to each other on the surfaces of the toner base particles is less than 500 nm.

17 Claims, 2 Drawing Sheets

(56) References Cited

U.S. PATENT DOCUMENTS

| | | | |
|---|---|---|---|
| 2016/0187795 | A1 | 6/2016 | Saitoh et al. |
| 2016/0209766 | A1 | 7/2016 | Chiba et al. |
| 2016/0231661 | A1 | 8/2016 | Nagai et al. |
| 2016/0259257 | A1 | 9/2016 | Sugimoto et al. |
| 2016/0370720 | A1 | 12/2016 | Yamashita et al. |
| 2017/0108791 | A1 | 4/2017 | Hashida et al. |
| 2017/0199476 | A1 | 7/2017 | Santoh et al. |
| 2017/0363980 | A1 | 12/2017 | Nagata et al. |
| 2017/0371257 | A1 | 12/2017 | Santo et al. |
| 2018/0024452 | A1 | 1/2018 | Sugimoto et al. |
| 2018/0052403 | A1 | 2/2018 | Inoue et al. |
| 2018/0224763 | A1 | 8/2018 | Tanaka et al. |
| 2018/0253022 | A1 | 9/2018 | Takeda et al. |
| 2018/0299816 | A1* | 10/2018 | Sakaguchi ......... G03G 15/0856 |
| 2018/0329323 | A1* | 11/2018 | Kimura ................ G03G 9/0825 |
| 2018/0364600 | A1 | 12/2018 | Fuwa et al. |
| 2019/0171122 | A1 | 6/2019 | Ukigaya et al. |
| 2019/0227449 | A1 | 7/2019 | Nemoto et al. |
| 2019/0243291 | A1 | 8/2019 | Matsuda et al. |
| 2020/0012206 | A1 | 1/2020 | Takebayashi et al. |
| 2020/0292954 | A1 | 9/2020 | Aoyama et al. |
| 2020/0301348 | A1 | 9/2020 | Nakayama et al. |
| 2021/0063916 | A1 | 3/2021 | Takei et al. |
| 2021/0116830 | A1 | 4/2021 | Takei et al. |

FOREIGN PATENT DOCUMENTS

| | | |
|---|---|---|
| JP | 2007-233366 | 9/2007 |
| JP | 2012-163694 | 8/2012 |
| JP | 2013-011644 | 1/2013 |
| JP | 2015-052697 | 3/2015 |
| JP | 2015-052698 | 3/2015 |
| JP | 2015-079150 | 4/2015 |
| JP | 2016-014130 | 1/2016 |
| JP | 2019-099809 | 6/2019 |
| JP | 2019099809 A * | 6/2019 |
| JP | 2019-143128 | 8/2019 |

OTHER PUBLICATIONS

JP-2019099809-A Translation (Year: 2023).*

Robert F. Fedors, "A Method for Estimating Both the Solubility Parameters and Molar Volumes of Liquids", Polymer Engineering and Science, Feb. 1974, vol. 14, No. 2, p. 147-154.

Japanese Office action dated Dec. 19, 2023, in Japanese Application No. 2020-086612, 3 pages.

* cited by examiner

TONER AND PRODUCTION METHOD THEREOF, TONER STORED UNIT, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application No. 2020-086612, filed on May 18, 2020, in the Japan Patent Office, the entire disclosure of which is hereby incorporated by reference herein.

BACKGROUND

Technical Field

The present disclosure relates to a toner and a production method thereof, a toner stored unit, an image forming apparatus, and an image forming method.

Description of the Related Art

In recent years, a toner has been desired to have a small particle size and high hot offset resistance for improving quality of output images, low temperature fixing ability for energy saving, and heat resistant storage stability enough to resist high temperature and high humidity environments during storage or transportation after production. Improvement in low temperature fixing ability of the toner is particularly desired because energy consumed during fixing occupies the majority of the total energy consumption of an image formation process.

In attempting to improve low temperature fixing ability of a toner, a low-melting-point material has been used for the toner. However, the toner produced using the low-melting-point material has unsatisfactory heat resistant storage stability. Namely, low temperature fixing ability and heat resistant storage stability are in a trade-off relationship.

SUMMARY

According to one aspect of the present disclosure, a toner includes toner base particles and resin particles on surfaces of the toner base particles. The toner base particles each include a binder resin, a colorant, and wax. A standard deviation of a distance between the resin particles next to each other on the surfaces of the toner base particles is less than 500 nm.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
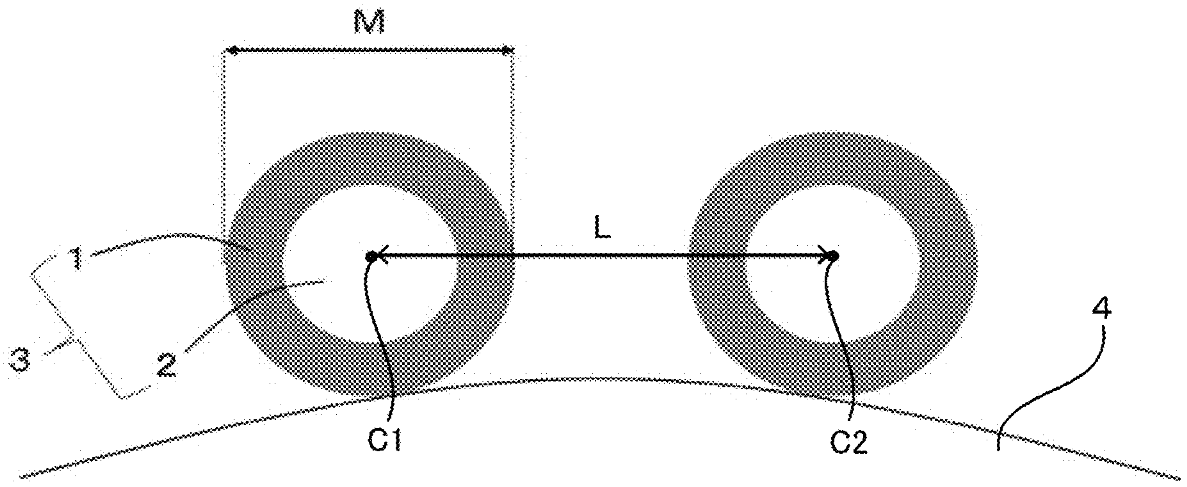
FIG. 1 is a schematic view illustrating one example of a state of a toner surface.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to the present disclosure, it is possible to provide a toner, which can achieve high levels of low temperature fixing ability and heat resistant storage stability, and can prevent formation of defect images caused by filming while maintaining excellent cleanability.

(Toner)

The toner of the present disclosure includes toner base particles and resin particles on surfaces of the toner base particles. The toner base particles each include a binder resin, a colorant, and wax. A standard deviation of a distance between the resin particles next to each other on the surfaces of the toner base particles is less than 500 nm. The toner may further include other components according to the necessity.

In related art, additives formed of inorganic particles, such as silica and titanium oxide, are deposited on surfaces of particles of a typical toner in order to impart flowability or chargeability to the toner. It is known that the additives detached from the toner particles blocked by a cleaning blade on an image bearer are supplied to a contact part between the cleaning blade and the image bearer to form a layer of the accumulated additives. The layer of the accumulated additives functions as a lubricant between the cleaning blade and the image bearer to impart excellent cleanability to the toner particles. Once an excessive amount of the additives is detached, however, there is a problem that image defects tend to occur due to filming.

In the present disclosure, a standard deviation of a distance between the resin particles next to each other on surfaces of toner base particles is less than 500 nm, and the resin particles next to each other are aligned at uniform intervals to some extent (aligned substantially uniformly). As the surfaces of the toner base particles are covered with the resin particles, which do not inhibit fixing, to make the toner hard to ensure reliability (storage stability and adhesive force), the toner can achieve high levels of low temperature fixing ability and heat resistant storage stability, and can prevent image defects due to filming while maintaining excellent cleanability.

<Resin Particles>

The resin particles are on the surfaces of the toner base particles.

The standard deviation of the distance between the resin particles next to each other on the surfaces of the toner base particles is less than 500 nm, preferably 250 nm or less, and more preferably 100 nm or less. The lower limit of the standard deviation is preferably 10 nm or greater.

When the standard deviation is less than 500 nm, high levels of low temperature fixing ability and heat resistant storage stability are achieved, and image defects due to filming can be prevented while maintaining excellent cleanability.

The average value of the distance between the resin particles is preferably 10 nm or greater but 500 nm or less, and more preferably 20 nm or greater but 250 nm or less.

Examples of a method for adjusting the standard deviation of the distance between the resin particles next to each other on the surfaces of the toner base particles to less than 500 nm include, but are not limited to: a method where a composition is formulated to achieve a 90% or greater covering ratio of the resin particles covering toner base particles to give the intended particle diameter, and the resin particles are added during an emulsifying step to closely deposit the resin particles on surfaces of the toner base particles; and a method where an average circularity of the toner base particles is adjusted to efficiently deposit the resin particles to shorten a distance between the resin particles.

In the present disclosure, the distance between the resin particles next to each other is a distance connecting the center of one resin particle with the center of another resin particle next to the one resin particle. The center of the resin particle is determined by observing the resin particle under a scanning electron microscope (SEM) to capture an image of the resin particle, and determine the center of the resin particle on the captured image.

The surface of the toner base particle is not flat but is slightly rounded (curved). Therefore, the distance between the resin particles is not measured as a distance between the resin particles on the surface of the toner base particle, but is the shortest distance between the resin particles on an image of the resin particles on the surface of the toner base particle captured by a scanning electron microscope (SEM).

FIG. 1 is a schematic view illustrating one example of a state of a toner surface. Resin particles 3 are deposited on the surface of a toner base particle 4. Each resin particle 3 is formed of a core resin (b2) 2 and a shell resin (b1) 1, which will be described below. C1 and C2 are the centers of the resin particles 3. M is the volume average primary particle diameter of the resin particle 3. L is a distance between the resin particles 3 next to each other.

<Measurement of Distance Between Resin Particles>

In the manner as described below, the external additives are removed as much as possible by a separation treatment using ultrasonic waves to turn the toner to the state close to the toner base particle. Then, the average distance between the resin particles next to each other, and the standard deviation thereof are determined.

Method for Separating External Additives

[1] A 100 mL screw tube is charged with 50 mL of a 5% by mass surfactant aqueous solution (product name: NOIGEN ET-165, available from DKS Co., Ltd.), and 3 g of the toner is added to the aqueous solution, followed by gently moving the solution in up-down and left-right motions. The resultant solution is stirred for 30 minutes by a ball mill to allow the toner to conform to the dispersion solution.

[2] Ultrasonic energy is applied to the dispersion solution by means of au ultrasonic homogenizer (product name: Homogenizer, model: VCX750, CV33, available from SONICS & MATERIALS, INC.) for 60 minutes, with the output set to 40 W.

—Ultrasonic Wave Conditions—

Oscillation time: continuously 60 minutes
Amplitude: 40 W
Oscillation onset temperature: 23±1.5° C.
Temperature during oscillation: 23±1.5° C.

[3] (1) The resultant dispersion liquid is subjected to vacuum filtration with filter paper (product name: Qualitative filter paper (No. 2, 110 mm), available from Toyo Roshi Kaisha, Ltd.), and the obtained filtration cake is washed twice with ion-exchanged water, followed by filtering off the separated external additives. Then, the obtained toner particles are dried.

(2) The toner obtained in (1) is observed under a scanning electron microscope (SEM). First, a backscattered electron image is observed to detect the external additives or filler including Si.

(3) The image of (2) is binarized using image processing software (Image J) to eliminate the external additives and filler.

Next, a secondary electron image of the toner is observed at the same position as in the (2). The resin particles are not observed in the backscattered electron image, but only in the secondary electron image. The obtained secondary electron image is compared to the image obtained in the (3), and the particles present in the area other than the external additives and filler (the area other than the area eliminated in the (3)) are determined as resin particles. The distance between the resin particles (the distance between the center of one particle to the center of another particle present next to the one particle) is measured using the image processing software.

The above measurement is performed on 100 binarized images (one toner particle per image) and the average value of the measured values is determined as the average distance between the resin particles next to each other.

The standard deviation of the distance between the resin particles is calculated according to the following mathematical expression where the distance between the resin particles is x.

$$\sqrt{\frac{1}{n-1}\sum_{k=1}^{n}(x_i - \bar{x})}$$

[Imaging Conditions]

Scanning electron microscope: SU-8230 (available from Hitachi High-Tech Corporation) Image magnification: 35,000 times
Images: secondary electron (SE) (L), backscattered electron (BSE)
Acceleration voltage: 2.0 kV
Acceleration current: 1.0 μA
Probe current: Normal
Focus mode: UHR
WD: 8.0 mm The volume average primary particle diameter of the resin particles is preferably 5 nm or greater but 100 nm or less, and more preferably 10 nm or greater but 50 nm or less. When the volume average primary particle diameter of the resin particles is 5 nm or greater but 100 nm or less, excellent low temperature fixing ability can be achieved.

For example, the volume average primary particle diameter can be measured by observing a scanning electron microscopic (SEM) image.

The resin particle (hereinafter may be referred to as "resin particle (B)") preferably includes a core resin (a core) and a shell resin (a shell) covering at least part of the surface of the core resin. More preferably, the resin particle is formed of the core resin and the shell resin. Even more preferably, the resin particle includes a vinyl-based unit formed of resin (b1) and resin (b2).

The shell resin (hereinafter may be referred to as "resin (b1)") and the core resin (hereinafter may be referred to as "resin (b2)") are each preferably a polymer obtained through homopolymerization or copolymerization of vinyl monomers.

Examples of the vinyl monomer include the following (1) to (10).

(1) Vinyl Hydrocarbon

Examples of the vinyl hydrocarbon include, but are not limited to, (1-1) aliphatic vinyl hydrocarbon, (1-2) alicyclic vinyl hydrocarbon, and (1-3) aromatic vinyl hydrocarbon.

(1-1) Aliphatic Vinyl Hydrocarbon

Examples of the aliphatic vinyl hydrocarbon include, but are not limited to, alkene and alkadiene.

Examples of the alkene include, but are not limited to, ethylene, propylene, and α-olefin.

Examples of the alkadiene include, but are not limited to, butadiene, isoprene, 1,4-pentadiene, 1,6-hexadiene, and 1,7-octadiene.

(1-2) Alicyclic Vinyl Hydrocarbon

Examples of the alicyclic vinyl hydrocarbon include, but are not limited to, mono- or di-cycloalkene and alkadiene. Specific examples thereof include, but are not limited to, (di)cyclopentadiene and terpene.

(1-3) Aromatic Vinyl Hydrocarbon

Examples of the aromatic vinyl hydrocarbon include, but are not limited to, styrene and hydrocarbyl (at least one selected from the group consisting of alkyl, cycloalkyl, aralkyl, and alkenyl) substituted products thereof. Specific examples thereof include, but are not limited to, α-methylstyrene, 2,4-dimethylstyrene, and vinyl naphthalene.

(2) Carboxyl Group-Containing Vinyl Monomer and Salts Thereof

Examples of the carboxyl group-containing vinyl monomer and salts thereof include, but are not limited to, unsaturated monocarboxylic acid (salt) having from 3 through 30 carbon atoms (C3-C30), unsaturated dicarboxylic acid (salt), anhydride (salt) thereof, and monoalkyl (C1-C24) esters thereof or salts thereof.

Specific examples thereof include, but are not limited to, carboxyl group-containing vinyl monomers, such as (meth) acrylic acid, maleic acid (anhydride), maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester, and cinnamic acid, and metal salts thereof.

In the present specification, the term "(salt)" means acid or a salt of the acid.

For example, C3-C30 unsaturated monocarboxylic acid (salt) means C3-C30 unsaturated monocarboxylic acid or salts of the C3-C30 unsaturated monocarboxylic acid.

In the present specification, the term "(meth)acrylic acid" means methacrylic acid or acrylic acid.

In the present specification, the term "(meth)acryloyl" means methacryloyl or acryloyl.

In the present specification, the term "(meth)acrylate" means methacrylate or acrylate.

(3) Sulfonic Acid Group-Containing Vinyl Monomer, Vinyl Sulfuric Acid Monoester, and Salts Thereof Examples of the sulfonic acid group-containing vinyl monomer, vinyl sulfuric acid monoester, and salts thereof include, but are not limited to, C2-C14 alkene sulfonic acid (salt), C2-C24 alkyl sulfonic acid (salt), sulfo(hydroxy) alkyl-(meth)acrylate (salt) or (meth)acrylamide (salt), and alkylallyl sulfosuccinic acid (salt).

Specifically, examples of the C2-C14 alkene sulfonic acid include, but are not limited to, vinyl sulfonic acid (salt), examples of the C2-C24 alkyl sulfonic acid (salt) include, but are not limited to, α-methylstyrene sulfonic acid (salt), and examples of the sulfo(hydroxy)alkyl-(meth)acrylate (salt) or (meth)acrylamide (salt) include, but are not limited to, sulfopropyl (meth)acrylate (salt), sulfuric acid ester (salt), and sulfonic acid group-containing vinyl monomer (salt).

(4) Phosphoric Acid Group-Containing Vinyl Monomer and Salt Thereof

Examples of the phosphoric acid group-containing vinyl monomer and salt thereof include, but are not limited to, (meth)acryloyloxyalkyl (C1-C24) phosphoric acid monoester (salt) and (meth)acryloyloxyalkyl (C1-C24) phosphonic acid (salt).

Specific examples of the (meth)acryloyloxy alkyl (C1-C24) phosphoric acid monoester (salt) include, but are not limited to, 2-hydroxyethyl(meth)acryloyl phosphate (salt) and phenyl-2-acryloyloxyethyl phosphate (salt).

Specific examples of the (meth)acryloyloxy alkyl (C1-C24) phosphonic acid (salt) include, but are not limited to, 2-acryloyloxyethylphosphonic acid (salt).

Examples of the salts of (2) to (4) include, but are not limited to, alkali metal salts (e.g., sodium salts and potassium salts), alkaline earth metal salts (e.g., calcium salts and magnesium salts), ammonium salts, amine salts, and quaternary ammonium salts.

(5) Hydroxyl Group-Containing Vinyl Monomer

Examples of the hydroxyl group-containing vinyl monomer include, but are not limited to, hydroxy styrene, N-methylol(meth)acrylamide, hydroxyethyl (meth)acrylate, hydroxypropyl (meth)acrylate, polyethylene glycol mono (meth)acrylate, (meth)allyl alcohol, crotyl alcohol, isocrotyl alcohol, 1-buten-3-ol, 2-buten-1-ol, 2-butene-1,4-diol, propargyl alcohol, 2-hydroxyethylpropenyl ether, and sucrose allyl ether.

(6) Nitrogen-Containing Vinyl Monomer

Examples of the nitrogen-containing vinyl monomer include, but are not limited to, (6-1) an amino group-containing vinyl monomer, (6-2) an amide group-containing vinyl monomer, (6-3) a nitrile group-containing vinyl monomer, (6-4) a quaternary ammonium cation group-containing vinyl monomer, and (6-5) a nitro group-containing vinyl monomer.

Examples of the (6-1) amino group-containing vinyl monomer include, but are not limited to, aminoethyl (meth) acrylate.

Examples of the (6-2) amide group-containing vinyl monomer include, but are not limited to, (meth)acrylamide and N-methyl(meth)acrylamide.

Examples of the (6-3) nitrile group-containing vinyl monomer include, but are not limited to, (meth)acrylonitrile, cyanostyrene, and cyanoacrylate.

Examples of the (6-4) quaternary ammonium cation group-containing vinyl monomer include, but are not limited to, quaternarized products (products quaternarized using a quaternarization agent, such as methyl chloride, dimethyl sulfate, benzyl chloride, and dimethyl carbonate) of a tertiary amine group-containing vinyl monomer, such as dimethylaminoethyl (meth)acrylate, diethylaminoethyl (meth) acrylate, dimethylaminoethyl (meth)acrylamide, diethylaminoethyl (meth)acrylamide, and diallyl amine.

Examples of the (6-5) nitro group-containing vinyl monomer include, but are not limited to, nitrostyrene.

(7) Epoxy Group-Containing Vinyl Monomer

Examples of the epoxy group-containing vinyl monomer include, but are not limited to, glycidyl (meth)acrylate, tetrahydrofurfuryl (meth)acrylate, and p-vinyl phenyl phenyl oxide.

(8) Halogen Element-Containing Vinyl Monomer

Examples of the halogen element-containing vinyl monomer include, but are not limited to, vinyl chloride, vinyl bromide, vinylidene chloride, allyl chloride, chlorostyrene, bromostyrene, dichlorostyrene, chloromethylstyrene, tetrafluorostyrene, and chloroprene.

(9) Vinyl Ester, Vinyl (thio) Ether, and Vinyl Ketone

Examples of the vinyl ester include, but are not limited to, vinyl acetate, vinyl butyrate, vinyl propionate, vinyl butyrate, diallyl phthalate, diallyl adipate, isopropenyl acetate, vinyl methacrylate, methyl 4-vinylbenzoate, cyclohexyl methacrylate, benzyl methacrylate, phenyl (meth) acrylate, vinyl methoxy acetate, vinyl benzoate, ethyl α-ethoxyacrylate, C1-C50 alkyl group-containing alkyl (meth)acrylate [e.g., methyl (meth)acrylate, ethyl (meth) acrylate, propyl (meth)acrylate, butyl (meth)acrylate, 2-ethylhexyl (meth)acrylate, dodecyl (meth)acrylate, hexadecyl (meth)acrylate, heptadecyl (meth)acrylate, octadecyl (meth) acrylate, eicosyl (meth)acrylate, and behenyl (meth)acrylate)], dialkyl fumarate (the two alkyl groups are C2-C8 straight-chain, branched-chain, or alicyclic groups), dialkyl maleate (the two alkyl groups are C2-C8 straight-chain, branched-chain, or alicyclic groups), poly(meth)allyloxyalkane [e.g., diallyloxyethane, triallyloxy ethane, tetraallyloxyethane, tetraallyloxypropane, tetraallyloxybutane, and tetramethallyloxyethane], polyalkylene glycol chain-containing vinyl monomer [e.g., polyethylene glycol (molecular weight: 300) mono(meth)acrylate, polypropylene glycol (molecular weight: 500) monoacrylate, methyl alcohol ethylene oxide (10 mol) adducts of (meth)acrylate, and lauryl alcohol ethylene oxide (30 mol) adducts of (meth)acrylate], and poly(meth)acrylate [e.g., poly(meth)acrylate of polyvalent alcohol, ethylene glycol di(meth)acrylate, propylene glycol di(meth)acrylate, neopentyl glycol di(meth)acrylate, trimethylol propane tri(meth)acrylate, and polyethylene glycol di(meth)acrylate].

Examples of the vinyl (thio) ether include, but are not limited to, vinyl methyl ether.

Examples of the vinyl ketone include, but are not limited to, vinyl methyl ketone.

(10) Other Vinyl Monomers

Examples of the other vinyl monomers include, but are not limited to, tetrafluoroethylene, fluoroacrylate, isocyanatoethyl (meth)acrylate, and m-isopropenyl-α,α-dimethylbenzyl isocyanate.

For the synthesis of the resin (b1), the (1) to (10) vinyl monomers may be used alone or in combination.

In view of low temperature fixing ability, the resin (b1) is preferably a styrene-(meth)acrylic acid ester copolymer and a (meth)acrylic acid ester copolymer are preferable, with a styrene-(meth)acrylic acid ester copolymer being more preferable.

Since the resin (b1) includes carboxylic acid, a desirable acid value is given to the resin, and toner particles in which the resin particles (B) are on surfaces of the toner particles are easily formed.

Examples of the vinyl monomer used for the resin (b2) include the same vinyl monomers listed for the resin (b1).

For the synthesis of the resin (b2), the vinyl monomers (1) to (10) listed for the resin (b1) may be used alone or in combination.

In view of low temperature fixing ability, the resin (b2) is preferably a styrene-(meth)acrylic acid ester copolymer and a (meth)acrylic acid ester copolymer are preferable, with a styrene-(meth)acrylic acid ester copolymer being more preferable.

The loss modulus G" of the resin (b1), which indicates viscoelastic properties thereof at 100° C. with a frequency of 1 Hz, is preferably from 1.5 MPa through 100 MPa, more preferably from 1.7 MPa through 30 MPa, and even more preferably from 2.0 MPa through 10 MPa.

The loss modulus G" of the resin (b2), which indicates viscoelastic properties thereof at 100° C. with a frequency of 1 Hz, is preferably from 0.01 MPa through 1.0 MPa, more preferably from 0.02 MPa through 0.5 MPa, and even more preferably from 0.05 MPa through 0.3 MPa.

When the loss modulus G" of the viscoelastic properties is within the above-mentioned range, it is easy to form toner particles in which the resin particles (B) including the resin (b1) and the resin (b2) in the same particle are deposited on surfaces of the toner particles.

The loss modulus G" of the resin (b1) or (b2), which indicates viscoelastic properties thereof at 100° C. with a frequency of 1 Hz, can be adjusted by changing constitutional monomers for use, varying a constitutional ratio of the monomers, or adjusting polymerization conditions (e.g., types and amounts of an initiator and a chain-transfer agent for use, and a reaction temperature).

Specifically, the G" of each resin can be adjusted to the above-mentioned range, for example, by using the following composition.

(1) When a glass transition temperature calculated from constitutional monomers of the resin (b1) is denoted by Tg1 and a glass transition temperature calculated from constitutional monomers of the resin (b2) is denoted by Tg2, Tg1 is preferably in the range of from 0° C. through 150° C., and more preferably from 50° C. through 100° C., and Tg2 is preferably in the range of from −30° C. through 100° C., more preferably from 0° C. through 80° C., and particularly preferably from 30° C. through 60° C.

Note that, the glass transition temperature (Tg) calculated from the constitutional monomers is a value calculated by the Fox method.

The Fox method [T. G. Fox, Phys. Rev., 86,652 (1952)] is a method where Tg of a copolymer is estimated from Tg of respective homopolymers according to the formula below.

$$1/Tg=W1/Tg1+W2/Tg2+ \dots +Wn/Tgn$$

[In the formula above, Tg is a glass transition temperature (absolute temperature) of a copolymer, Tg1, Tg2 . . . Tgn are each a glass transition temperature (absolute temperature) of a homopolymer of each monomer component, and W1, W2 . . . Wn are each a weight fraction of each monomer component.]

(2) When the calculated acid value of the resin (b1) is denoted by AV1 and the calculated acid value of the resin (b2) is denoted by AV2, AV1 is preferably in the range of from 75 mgKOH/g through 400 mgKOH/g, more preferably from 150 mgKOH/g through 300 mgKOH/g, and AV2 is preferably in the range of from 0 mgKOH/g through 50 mgKOH/g, more preferably from 0 mgKOH/g through 20 mgKOH/g, and particularly preferably 0 mgKOH/g.

Note that, the calculated acid value is a theoretical acid value calculated from an amount by mole of acidic groups included in the constitutional monomers, and a total weight of the constitutional monomers.

As the constitutional monomers of the resin (b1) satisfying the conditions (1) and (2), for example, the resin (b1) includes, as constitutional monomers, styrene preferably in an amount of from 10% by mass through 80% by mass and more preferably from 30% by mass through 60% by mass, and at least one of methacrylic acid and acrylic acid preferably in a total amount of from 10% by mass through 60% by mass and more preferably from 30% by mass through 50% by mass, relative to the total mass of the resin (b1).

As the constitutional monomers of the resin (b2) satisfying the conditions (1) and (2), for example, the resin (b2) includes, as constitutional monomers, styrene preferably in an amount of from 10% by mass through 100% by mass and more preferably from 30% by mass through 90% by mass, and at least one methacrylic acid and acrylic acid preferably in a total amount of from 0% by mass through 7.5% by mass and more preferably from 0% by mass through 2.5% by mass, relative to the total mass of the resin (b2).

(3) The polymerization conditions (e.g., types and amounts of an initiator and a chain-transfer agent, and a reaction temperature) are adjusted. As the number average molecular weight (Mn1) of the resin (b1) and the number average molecular weight (Mn2) of the resin (b2), the number average molecular weight (Mn1) is preferably from 2,000 through 2,000,000 and more preferably from 20,000 through 200,000, and the number average molecular weight (Mn2) is preferably from 1,000 through 1,000,000 and more preferably from 10,000 through 100,000.

In the present disclosure, the loss modulus G" of viscoelastic properties can be measured by the following rheometer.

Device: ARES-24A (available from Rheometric Scientific)
Jig: 25 mm parallel plate
Frequency: 1 Hz
Distortion factor: 10%
Heating rate: 5° C./min The acid value (AVb1) of the resin (b1) is preferably from 75 mgKOH/g through 400 mgKOH/g, and more preferably from 150 mgKOH/g through 300 mgKOH/g.

When the acid value is within the above-mentioned range, it is easy to form toner particles in which the resin particles (B) including a vinyl-based unit, which includes the resin (b1) and the resin (b2) within the same particle, are deposited on surfaces of the toner particles.

The resin (b1) having the acid value within the above-mentioned range is a resin including at least one of methacrylic acid and acrylic acid preferably in a total amount of from 10% by mass through 60% by mass and more preferably from 30% by mass through 50% by mass, relative to the total mass of the resin (b1).

In view of low temperature fixing ability, the acid value (AVb2) of the resin (b2) is preferably from 0 mgKOH/g through 50 mgKOH/g, more preferably from 0 mgKOH/g through 20 mgKOH/g, and even more preferably 0 mgKOH/g.

The resin (b2) having the acid value within the above-mentioned range is a resin including at least one of methacrylic acid and acrylic acid preferably in a total amount of from 0% by mass through 7.5% by mass and more preferably from 0% by mass through 2.5% by mass, relative to the total mass of the resin (b2).

For example, the acid value can be measured by the method according to JIS K0070:1992.

The glass transition temperature of the resin (b1) is preferably higher than the glass transition temperature of the resin (b2), and is more preferably higher than the glass transition temperature of the resin (b2) by 10° C. or greater and even more preferably by 20° C. or greater.

When the glass transition temperature of the resin (b1) and the glass transition temperature of the resin (b2) are in the above relationship, excellent balance between easiness of formation of toner particles including toner base particles including the resin particles (B) on the surface thereof, and low temperature fixing ability of the toner particles of the present disclosure can be achieved.

The glass transition temperature (hereinafter may be abbreviated to as Tg) of the resin (b1) is preferably from 0° C. through 150° C. and more preferably from 50° C. through 100° C.

When the glass transition temperature is 0° C. or higher, heat resistant storage stability of the resultant toner can be improved. When the glass transition temperature is 150° C. or lower, the resin (b1) impairs low temperature fixing ability of the resultant toner to a less extent.

The Tg of the resin (b2) is preferably from −30° C. through 100° C., more preferably from 0° C. through 80° C., and even more preferably from 30° C. through 60° C. When the glass transition temperature of the resin (b2) is −30° C. or higher, heat resistant storage stability of the resultant toner can be improved. When the glass transition temperature thereof is 100° C. or lower, the resin (b2) impairs low temperature fixing ability of the resultant toner to a less extent.

In the present specification, the Tg is measured by a method (DSC) stipulated in ASTM D3418-82 by means of "DSC20, SSC/580" available from Seiko Instruments Inc.

A solubility parameter (hereinafter may be abbreviated as an SP value) of the resin (b1) is preferably from 9 $(cal/cm^3)^{1/2}$ through 13 $(cal/cm^3)^{1/2}$, more preferably from 9.5 $(cal/cm^3)^{1/2}$ through 12.5 $(cal/cm^3)^{1/2}$, and even more preferably from 10.5 $(cal/cm^3)^{1/2}$ through 11.5 $(cal/cm^3)^{1/2}$, in view of easiness of formation of toner particles.

The SP value of the resin (b1) can be adjusted by changing monomers constituting the resin (b1) or varying a constitutional ratio of the monomers.

An SP value of the resin (b2) is preferably from 8.5 $(cal/cm^3)^{1/2}$ through 12.5 $(cal/cm^3)^{1/2}$, more preferably from 9 $(cal/cm^3)^{1/2}$ through 12 $(cal/cm^3)^{1/2}$, and even more preferably from 10 $(cal/cm^3)^{1/2}$ through 11 $(cal/cm^3)^{1/2}$, in view of easiness of formation of toner particles.

The SP value of the resin (b2) can be adjusted by changing monomers constituting the resin (b2) or varying a constitutional ratio of the monomers.

In the present disclosure, the SP value can be calculated by the Fedors method [Polym. Eng. Sci. 14(2)152, (1974)].

In view of the Tg of the resin (b1) and copolymerizability with other monomers, the resin (b1) preferably includes, as a constitutional monomer, styrene in an amount of from 10% by mass through 80% by mass and more preferably from 30% by mass through 60% by mass, relative to the total mass of the resin (b1).

In view of the Tg of the resin (b2) and copolymerizability with other vinyl monomers, the resin (b2) preferably includes, as a constitutional monomer, styrene in an amount of from 10% by mass through 100% by mass and more preferably from 30% by mass through 90% by mass, relative to the total mass of the resin (b2).

The number average molecular weight (Mn) of the resin (b1) is preferably from 2,000 through 2,000,000 and more preferably from 20,000 through 200,000. When the number average molecular weight thereof is 2,000 or greater, heat resistant storage stability of the resultant toner is improved.

When the number average molecular weight thereof is 2,000,000 or less, the resin (b1) impairs low temperature fixing ability of the resultant toner to a less extent.

The weight average molecular weight (Mw) of the resin (b1) is preferably greater than the weight average molecular weight of the resin (b2), more preferably 1.5 or more times greater than the weight average molecular weight of the resin (b2), and even more preferably 2.0 or more times greater than the weight average molecular weight of the resin (b2). When the weight average molecular weight (Mw) of the resin (b1) is within the above range, excellent balance between easiness of formation of toner particles and low temperature fixing ability of the toner particles is achieved.

The weight average molecular weight (Mw) of the resin (b1) is preferably from 20,000 through 20,000,000 and more preferably from 200,000 through 2,000,000. When the weight average molecular weight thereof is 20,000 or greater, heat resistant storage stability of the resultant toner is improved. When the weight average molecular weight thereof is 20,000,000 or less, the resin (b1) impairs low temperature fixing ability of the resultant toner to a less extent.

The number average molecular weight (Mn) of the resin (b2) is preferably from 1,000 through 1,000,000 and more preferably from 10,000 through 100,000. When the Mn of the resin (b2) is 1,000 or greater, heat resistant storage stability of the resultant toner is improved. When the Mn of the resin (b2) is 1,000,000 or less, the resin (b2) impairs low temperature fixing ability of the resultant toner to a less extent.

The weight average molecular weight (Mw) of the resin (b2) is preferably from 10,000 through 10,000,000 and more preferably from 100,000 through 1,000,000. When the Mw of the resin (b2) is 10,000 or greater, heat resistant storage stability of the resultant toner is improved. When the Mw of the resin (b2) is 10,000,000 or lower, the resin (b2) impairs low temperature fixing ability of the resultant toner to a less extent.

Among the above embodiments, a preferable embodiment is where the Mw of the resin (b1) is from 200,000 through 2,000,000, the Mw of the resin (b2) is from 100,000 through 500,000, and the Mw of the resin (b1) is greater than the Mw of the resin (b2); i.e., [Mw of (b1)>Mw of (b2)].

In the present disclosure, the Mn and the Mw can be measured by gel permeation chromatography (GPC) under the following conditions.

- Device (example): HLC-8120, available from Tosoh Corporation
- Column (example): 2 columns, TSK GEL GMH6, available from Tosoh Corporation
- Measuring temperature: 40° C.
- Sample solution: 0.25% by weight tetrahydrofuran solution (obtained by separating insoluble components using a glass filter)
- Amount of solution applied: 100 μL
- Detector: refractive index detector
- Standard substances: 12 samples of standard polystyrene (TSK standard POLYSTYRENE) (molecular weights: 500, 1,050, 2,800, 5,970, 9,100, 18,100, 37,900, 96,400, 190,000, 355,000, 1,090,000, and 2,890,000) [available from Tosoh Corporation]

A mass ratio between the resin (b1) and the resin (b2) in the resin particles (B) is preferably from 5/95 through 95/5, more preferably from 25/75 through 75/25, and even more preferably from 40/60 through 60/40. When the mass ratio between the resin (b1) and the resin (b2) is 5/95 or greater, a toner having excellent heat resistant storage stability is obtained. When the mass ratio between the resin (b1) and the resin (b2) is 95/5 or less, it is easy to form toner particles in which the resin particles (B) are deposited on surfaces of the toner base particles.

Any production method known in the art may be used as a production method of the resin particles (B). Examples of the production method of the resin particles (B) include, but are not limited to, the following production methods (I) to (V).

(I) A method where seed polymerization of constitutional monomers of the resin (b2) is performed using the particles of the resin (b1) in an aqueous dispersion liquid as seeds.

(II) A method where seed polymerization of constitutional monomers of the resin (b1) is performed using the particles of the resin (b2) in an aqueous dispersion liquid as seeds.

(III) A method where a mixture of the resin (b1) and the (b2) is emulsified in an aqueous medium to obtain an aqueous dispersion liquid of resin particles.

(IV) A method where a mixture of the resin (b1) and constitutional monomers of the resin (b2) is emulsified in an aqueous medium, followed by polymerizing the constitutional monomers of the resin (b2), to obtain an aqueous dispersion liquid of resin particles.

(V) A method where a mixture of the resin (b2) and constitutional monomers of the resin (b1) is emulsified in an aqueous medium, followed by polymerizing the constitutional monomers of the resin (b1), to obtain an aqueous dispersion liquid of resin particles.

Whether each of the resin particles (B) includes the shell resin (b1) and the core resin (b2) as constitutional components within the same particle can be confirmed by processing cross-sections of the resin particles (B) by means of a known surface elemental analyzer (e.g., TOF-SIMSEDX-SEM) to observe an element mapping, or by observing cross-sections of the resin particles (B) dyed with a dye chosen corresponding to functional groups included in the resin (b1) and the resin (b2) under an electron microscope.

The resin particles obtained by the above method may be a mixture including the resin particles (B) including the resin (b1) and the resin (b2) as the constitutional components within the same particle, resin particles including only the resin (b1) as the constitutional component, and resin particles including only the resin (b2) as the constitutional unit. In the below-described composite step, the resin particles may be used as the mixture as is or may be used as the resin particles (B) alone by separating the resin particles (B) from the mixture.

Specific examples of the method (I) include, but are not limited to: a method where constitutional monomers of the resin (b1) are dripped and polymerized to produce an aqueous dispersion liquid of resin particles including the resin (b1), followed by polymerizing constitutional monomers of the resin (b2) through seed polymerization using the resin particles in the aqueous dispersion liquid as seeds; and a method where the resin (b1), which has been produced in advance by, for example, solution polymerization is emulsified and dispersed in water, and constitutional monomers of the resin (b2) are polymerized through seed polymerization using the dispersed components as seeds.

Specific examples of the method (II) include, but are not limited to: a method where constitutional monomers of the resin (b2) are dripped and polymerized to produce an aqueous dispersion liquid of resin particles including the resin (b2), followed by polymerizing constitutional monomers of the resin (b1) through seed polymerization using the resin particles in the aqueous dispersion liquid as seeds; and a method where the resin (b2), which has been produced in advance by, for example, solution polymerization is emulsified and dispersed in water, and constitutional monomers of the resin (b1) are polymerized through seed polymerization using the dispersed components as seeds.

Specific examples of the method (III) include, but are not limited to, a method where solutions or melts of the resin (b1) and the resin (b2) produced in advance by, for example, solution polymerization are mixed, followed by emulsifying and dispersing the mixture in an aqueous medium.

Specific examples of the method (IV) include, but are not limited to: a method where the resin (b1) produced in advance by, for example, solution polymerization is mixed with constitutional monomers of the resin (b2), and the mixture is emulsified and dispersed in an aqueous medium, followed by polymerizing the constitutional monomers of the resin (b2); and a method where the resin (b1) is produced in constitutional monomers of the resin (b2), and the resultant mixture is emulsified and dispersed in an aqueous medium, followed by polymerizing the constitutional monomers of the resin (b2).

Specific examples of the method (V) include, but are not limited to: a method where the resin (b2) produced in advance by, for example, solution polymerization is mixed with constitutional monomers of the resin (b1), and the mixture is emulsified and dispersed in an aqueous medium, followed by polymerizing the constitutional monomers of the resin (b1); and a method where the resin (b2) is produced in the constitutional monomers of the resin (b1), and the resultant mixture is emulsified and dispersed in an aqueous medium, followed by polymerizing the constitutional monomers of the resin (b1).

In the present disclosure, any of the production methods (I) to (V) above can be suitably used.

The resin particles (B) are preferably used in the form of an aqueous dispersion liquid.

Components used for the aqueous dispersion liquid (e.g., an aqueous medium) is not particularly limited as long as the components can dissolve in water, and may be appropriately selected depending on the intended purpose. Examples thereof include, but are not limited to, a surfactant (D), a buffer, and a protective colloid. These may be used alone or in combination.

The aqueous medium used for the aqueous dispersion liquid is not particularly limited as long as the aqueous medium is a liquid including water as an essential component. Examples thereof include, but are not limited to, an aqueous solution including water.

Examples of the surfactant (D) include, but are not limited to, a nonionic surfactant (D1), an anionic surfactant (D2), a cationic surfactant (D3), an amphoteric surfactant (D4), and other emulsifying dispersants (D5).

Examples of the nonionic surfactant (D1) include, but are not limited to, an allkylene oxide (AO) adduct nonionic surfactant and a polyvalent alcohol nonionic surfactant.

Examples of the AO adduct nonionic surfactant include, but are not limited to, C10-C20 aliphatic alcohol EO adducts, phenol EO adducts, nonyl phenol ethylene oxide (EO) adducts, C8-C22 alkyl amine EO adducts, and poly (oxypropylene)glycol EO adducts.

Examples of the polyvalent alcohol nonionic surfactant include, but are not limited to, fatty acid (C8-C24) ester of polyvalent (trivalent to octavalent, or higher polyvalent) alcohol (C2-C30) (e.g., glycerin monostearate, glycerin monooleate, sorbitan monolaurate, and sorbitan monooleate), and alkyl (C4-C24) polyglycoside (degree of polymerization: from 1 through 10).

Examples of the anionic surfactant (D2) include, but are not limited to: ether carboxylic acid including a C8-C24 hydrocarbon group and salts thereof: sulfuric acid ester or ether sulfuric acid ester including a C8-C24 hydrocarbon group and salts thereof; sulfonic acid salts including a C8-C24 hydrocarbon group; sulfosuccinic acid salts including one or two C8-C24 hydrocarbon groups; phosphoric acid ester or ether phosphoric acid ester including a C8-C24 hydrocarbon group and salts thereof; fatty acid salts including a C8-C24 hydrocarbon group; and acylated amino acid salts including a C8-C24 hydrocarbon group.

Examples of the ether carboxylic acid including a C8-C24 hydrocarbon group and salts thereof include, but are not limited to, sodium lauryl ether acetate and sodium (poly) oxyethylene (the number of moles added: from 1 through 100) lauryl ether acetate.

Examples of the sulfuric acid ester or ether sulfuric acid ester including a C8-C24 hydrocarbon group and salts thereof include, but are not limited to, sodium lauryl sulfate, sodium (poly)oxyethylene (the number of moles added: from 1 through 100) lauryl sulfate, triethanolamine (poly) oxyethylene (the number of moles added: from 1 through 100) lauryl sulfate, and (poly)oxyethylene (the number of moles added: from 1 through 100) coconut fatty acid monoethanolamide sodium sulfate.

Examples of the sulfonic acid salts including a C8-C24 hydrocarbon group include, but are not limited to, sodium dodecylbenzene sulfonate.

Examples of the phosphoric acid ester or ether phosphoric acid ester including a C8-C24 hydrocarbon group and salts thereof include, but are not limited to, sodium lauryl phosphate and sodium (poly)oxyethylene (the number of moles added: from 1 through 100) lauryl ether phosphate.

Examples of the fatty acid salts including a C8-C24 hydrocarbon group include, but are not limited to, sodium laurate and triethanolamine laurate.

Examples of the acylated amino acid salts including a C8-C24 hydrocarbon group include, but are not limited to, sodium methyl cocoyl taurate, sodium cocoyl sarcosinate, triethanolamine cocoyl sarcosinate, triethanol amine cocoyl glutamate, sodium cocoyl glutamate, and sodium N-methyl-N-(1-oxododecyl)-β-alaninate.

Examples of the cationic surfactant (D3) include, but are not limited to, a quaternary ammonium salt surfactant and an amine salt surfactant.

Examples of the quaternary ammonium salt surfactant include, but are not limited to, trimethylstearylammonium chloride, trimethylbehenylammonium chloride, dimethyldistearylammonium chloride, and lanolin fatty acid aminopropyl ethyl dimethyl ammonium ethyl sulfate.

Examples of the amine salt surfactant include, but are not limited to, stearamidoethyl diethylamine lactate, dilaurylamine hydrochloride, and oleylamine lactate.

Examples of the amphoteric surfactant (D4) include, but are not limited to, a betaine-based amphoteric surfactant and an amino acid-based amphoteric surfactant.

Examples of the betaine-based amphoteric surfactant include, but are not limited to, cocamidepropyl betaine, lauryl betaine, 2-alkyl-N-carboxymethyl-N-hydroxyethyl imidazolium betaine, and lauryl hydroxysulfobetaine.

Examples of the amino acid-based amphoteric surfactant include, but are not limited to, sodium β-laurylaminopropionate.

Examples of the other emulsifying and dispersant (D5) include, but are not limited to, a reactive active agent.

The reactive active agent is not particularly limited as long as the reactive active agent has radical reactivity, and may be appropriately selected depending on the intended purpose. Examples thereof include, but are not limited to: ADEKA REASOAP (registered trademark) SE-10N, SR-10, SR-20, SR-30, ER-20, and ER-30 (all available from ADEKA CORPORATION); AQUALON (registered trademark) HS-10, KH-05, KH-10, and KH-1025 (all available from DKS Co., Ltd.); ELEMINOL (registered trademark) JS-20 (available from Sanyo Chemical Industries, Ltd.); LATEMUL (registered trademark) D-104, PD-420, and PD-430 (all available from Kao Corporation); IONET (registered trademark) MO-200 (available from Sanyo Chemical Industries, Ltd.); polyvinyl alcohol; starch and derivatives thereof; cellulose derivatives, such as carboxymethyl cellulose, methyl cellulose, and hydroxyethyl cellulose; carboxyl group-containing (co)polymers, such as sodium polyacrylate; and emulsifying dispersants including a urethane group or an ester group disclosed in U.S. Pat. No. 5,906,704 (e.g., a compound where polycaprolactone polyol and polyether diol are linked via polyisocyanate).

The surfactant (D) is preferably (D1), (D2), or (D5) or any combination thereof, and more preferably a combination of (D1) and (D5) or a combination of (D2) and (D5) in view of stability of droplets to obtain desired shapes at the time of emulsification and dispersion and a sharp particle size distribution of the resultant toner.

Examples of the buffer include, but are not limited to, sodium acetate, sodium citrate, and sodium bicarbonate.

Examples of the protective colloid include, but are not limited to, a water-soluble cellulose compound and an alkali metal salt of polymethacrylic acid.

In addition to the shell resin (b1) and the core resin (b2), the resin particles (B) may each include other resin components, an initiator (and a residue thereof), a chain-transfer agent, an antioxidant, a plasticizer, a preservative, a reducing agent, an organic solvent, etc.

Examples of the above other resin components include, but are not limited to, a vinyl resin, a polyurethane resin, an epoxy resin, a polyester resin, a polyamide resin, a polyimide resin, a silicone resin, a phenol resin, a melamine resin, a urea resin, an aniline resin, an ionomer resin, and a polycarbonate resin, besides the resins used for the shell resin (b1) and the core resin (b2).

Examples of the initiator (and other residues) include, but are not limited to, radical polymerization initiators known in the art. Specific examples thereof include, but are not limited to: persulfate initiators, such as potassium persulfate and ammonium persulfate; azo initiators, such as azobisisobutylnitrile; organic peroxides, such as benzoyl peroxide, cumene hydroperoxide, tert-butyl hydroperoxide, tert-butyl peroxyisopropyl monocarbonate, and tert-butyl peroxybenzoate; and hydrogen peroxides.

Examples of the chain-transfer agent include, but are not limited to, n-dodecylmercaptan, tert-dodecylmercaptan, n-butylmercaptan, 2-ethylhexyl thioglycolate, 2-mercaptoethanol, β-mercaptopropionic acid, and α-methylstyrene dimer.

Examples of the antioxidant include, but are not limited to, a phenol compound, paraphenylene diamine, hydroquinone, an organic sulfur compound, and an organic phosphorus compound.

Examples of the phenol compound include, but are not limited to, 2,6-di-t-butyl-p-cresol, butylated hydroxyanisole, 2,6-di-t-butyl-4-ethylphenol, stearyl-β-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t-butylphenol), 4,4'-butylidenebis-(3-methyl-6-t-butylphenol), 1,1,3-tris-(2-methyl-4-hydroxy-5-t-butylphenyl)butane, 1,3,5-trimethyl-2,4,6-tris(3,5-di-t-butyl-4-hydroxybenzyl)benzene, tetrakis-[methylene-3-(3',5'-di-t-butyl-4'-hydroxyphenyl)propionate]methane, bis[3,3'-bis(4'-hydroxy-3'-t-butylphenyl)butyric acid]glycol ester, and tocopherol.

Examples of the paraphenylene diamine include, but are not limited to, N-phenyl-N'-isopropyl-p-phenylenediamine, N,N'-di-sec-butyl-p-phenylenediamine, N-phenyl-N-sec-butyl-p-phenylenediamine, N,N'-di-isopropyl-p-phenylenediamine, and N,N'-dimethyl-N,N'-di-t-butyl-p-phenylenediamine.

Examples of the hydroquinone include, but are not limited to, 2,5-di-t-octylhydroquinone, 2,6-didodecylhydroquinone, 2-dodecylhydroquinone, 2-dodecyl-5-chlorohydroquinone, 2-t-octyl-5-methylhydroquinone, and 2-(2-octadecenyl)-5-methylhydroquinone.

Examples of the organic sulfur compound include, but are not limited to, dilauryl-3,3'-thiodipropionate, distearyl-3,3'-thiodipropionate, and ditetradecyl-3,3'-thiodipropionate.

Examples of the organic phosphorus compound include, but are not limited to, triphenyl phosphine, tri(nonylphenyl) phosphine, tri(dinonylphenyl)phosphine, tricresyl phosphine, and tri(2,4-dibutylphenoxy)phosphine.

Examples of the plasticizer include, but are not limited to, phthalic acid ester, aliphatic dibasic acid ester, trimellitic acid ester, phosphoric acid ester, and fatty acid ester.

Examples of the phthalic acid ester include, but are not limited to, dibutyl phthalate, dioctyl phthalate, butyl benzyl phthalate, and isodecyl phthalate.

Examples of the aliphatic dibasic acid ester include, but are not limited to, di-2-ethylhexyl adipate and 2-ethylhexyl sebacate.

Examples of the trimellitic acid ester include, but are not limited to, tri-2-ethylhexyl trimellitate and trioctyl trimellitate.

Examples of the phosphoric acid ester include, but are not limited to, triethyl phosphate, 2-ethylhexyl phosphate, and tricresyl phosphate.

Examples of the fatty acid ester include, but are not limited to, butyl oleate.

Examples of the preservative include, but are not limited to, an organic nitrogen-sulfur compound preservative and an organic sulfur halogenated product preservative.

Examples of the reducing agent include, but are not limited to: reducing organic compounds, such as ascorbic acid, tartaric acid, citric acid, glucose, and formaldehyde sulfoxylate metal salts; and reducing inorganic compounds, such as sodium thiosulfate, sodium sulfite, sodium bisulfite, and sodium metabisulfite.

Examples of the organic solvent include, but are not limited to: ketone solvents, such as acetone and methyl ethyl ketone (hereinafter abbreviated as MEK); ester solvents, such as ethyl acetate and γ-butyrolactone; ether solvents, such as tetrahydrofuran (THF); amide solvents, such as N,N-dimethylformamide, N,N-dimethylacetamide, N-methyl-2-pyrrolidone, and N-methylcaprolactam; alcohol solvents, such as isopropyl alcohol; and aromatic hydrocarbon solvents, such as toluene and xylene.

The amount of the resin particles is preferably from 0.2% by mass through 5% by mass, relative to the toner. When the sum of the amount of the resin (b1) and the amount of the resin (b2) is within the above range, the resultant toner is improved in low temperature fixing ability and heat resistant storage stability. When the amount of the resin particles is 0.2% by mass or greater, the resultant toner is prevented from degradation in heat resistant storage stability thereof. When the amount of the resin particles is 5% by mass or less, the resultant toner is prevented from degradation in low temperature fixing ability thereof <Toner Base Particles>

The toner base particles (hereinafter may also be referred to as a “toner base” or “base particles”) each include a binder resin, a colorant, and wax, and may further include other components according to the necessity.

<<Binder Resin>>

The binder resin is not particularly limited and may be appropriately selected depending on the intended purpose. Examples of the binder resin include, but are not limited to, a polyester resin, a styrene-acrylic resin, a polyol resin, a vinyl-based resin, a polyurethane resin, an epoxy resin, a polyamide resin, a polyimide resin, a silicon-based resin, a phenol resin, a melamine resin, a urea resin, an aniline resin, an ionomer resin, and a polycarbonate resin. These may be used alone or in combination. Of these, a polyester resin is preferable because the polyester resin can impart flexibility to the resultant toner.

<<Polyester Resin>>

The polyester resin is not particularly limited and may be appropriately selected depending on the intended purpose. Examples of the polyester resin include, but are not limited to, a crystalline polyester resin, an amorphous polyester resin, and a modified polyester resin. These may be used alone or in combination.

—Amorphous Polyester Resin—

The amorphous polyester resin (hereinafter may also be referred to as “non-crystalline polyester,” “amorphous polyester,” an “amorphous polyester resin,” an “unmodified polyester resin,” or “polyester resin component A”) is not particularly limited and may be appropriately selected depending on the intended purpose. Examples thereof include, but are not limited to, an amorphous polyester resin obtained through reaction between polyol and polycarboxylic acid.

In the present disclosure, the amorphous polyester resin refers to a resin obtained through reaction between polyol and polycarboxylic acid, as described above. Modified polyester resins (e.g., the below-described prepolymer, and a modified polyester resin obtained through at least one of cross-linking and elongation reaction of the prepolymer) are not included in the amorphous polyester resin in the present disclosure. They are treated as a modified polyester resin.

The amorphous polyester is a polyester resin component soluble in tetrahydrofuran (THF).

The amorphous polyester (polyester resin component A) is preferably a linear polyester resin.

Examples of the polyol include, but are not limited to, diol.

Examples of the diol include, but are not limited to: bisphenol A alkylene (C2-C3) oxide adduct (the average number of moles added: from 1 through 10), such as polyoxypropylene(2.2)-2,2-bis(4-hydroxyphenyl)propane and polyoxyethylene(2.2)-2,2-bis(4-hydroxyphenyl)propane; ethylene glycol and propylene glycol; hydrogenated bisphenol A; and hydrogenated bisphenol A alkylene (C2-C3) oxide adduct (the average number of moles added: from 1 through 10). These may be used alone or in combination. The polyol preferably includes alkylene glycol in an amount of 40 mol % or greater.

Examples of the polycarboxylic acid include, but are not limited to, dicarboxylic acid.

Examples of the dicarboxylic acid include, but are not limited to, adipic acid, phthalic acid, isophthalic acid, terephthalic acid, fumaric acid, maleic acid, and succinic acid substituted with a C1-C20 alkyl group or a C2-C20 alkenyl group, such as dodecenyl succinic acid and octyl succinic acid. These may be used alone or in combination. The polycarboxylic acid preferably includes terephthalic acid in an amount of 50 mol % or greater.

The polyester resin component A may include at least one of trivalent or higher carboxylic acid and trivalent or higher alcohol, or a trivalent or higher epoxy compound at an terminal of a chain of the polyester resin component A in order to adjust an acid value or a hydroxyl value of the polyester resin component A.

The polyester resin component A preferably includes trivalent or higher aliphatic alcohol because the resultant image can give sufficient gloss and image density without unevenness.

Examples of the trivalent or higher carboxylic acid include, but are not limited to, trimellitic acid, pyromellitic acid, and acid anhydrides thereof.

Examples of the trivalent or higher alcohol include, but are not limited to, glycerin, pentaerythritol, and trimethylolpropane.

The molecular weight of the polyester resin component A is not particularly limited and may be appropriately selected depending on the intended purpose. The molecular weight thereof is preferably in the following ranges.

The weight average molecular weight (Mw) of the polyester resin component A is preferably from 3,000 through 10,000 and more preferably from 4,000 through 7,000.

The number average molecular weight (Mn) of the polyester resin component A is preferably from 1,000 through 4,000 and more preferably from 1,500 through 3,000.

The ratio (Mw/Mn) of the molecular weights of the polyester resin component A is preferably from 1.0 through 4.0 and more preferably from 1.0 through 3.5.

For example, the weight average molecular weight and the number average molecular weight can be measured by gel permeation chromatography (GPC).

The weight average molecular weight and the number average molecular weight that fall within the above ranges are preferable. This is because when the weight average molecular weight and the number average molecular weight are too low, the resultant toner may have poor heat resistant storage stability and poor resistance to stress, such as stirring inside a developing device, whereas when the weight average molecular weight and number average molecular weight are too high, the resultant toner may have high viscoelasticity as melted and have poor low temperature fixing ability. When the amount of a component having a molecular weight of 600 or less is too large, the resultant toner may have poor heat resistant storage stability and poor resistance to stress, such as stirring inside a developing device. When the amount of a component having a molecular weight of 600 or less is too small, the resultant toner may have poor low temperature fixing ability.

The amount of the THF soluble component having a molecular weight of 600 or less is preferably from 2% by mass through 10% by mass.

Examples of a method for adjusting the amount of the THF soluble component having a molecular weight of 600 or less include, but are not limited to, a method where the polyester resin component A is extracted with methanol to remove the component having a molecular weight of 600 or less to thereby purify the polyester resin component A.

The acid value of the polyester resin component A is not particularly limited and may be appropriately selected depending on the intended purpose. The acid value thereof is preferably from 1 mgKOH/g through 50 mgKOH/g and more preferably from 5 mgKOH/g through 30 mgKOH/g. When the acid value thereof is 1 mgKOH/g or greater, the resultant toner is easily negatively charged to improve affinity between the toner and paper during fixing the toner onto the paper, and therefore low temperature fixing ability can be improved. When the acid value thereof is 50 mgKOH/g or less, reduction in charging stability, e.g., charging stability in response to fluctuations of the environmental conditions, can be prevented.

The hydroxyl value of the polyester resin component A is not particularly limited and may be appropriately selected depending on the intended purpose. The hydroxyl value thereof is preferably 5 mgKOH/g or greater.

The glass transition temperature (Tg) of the polyester resin component A is preferably from 40° C. through 65° C., more preferably 45° C. through 65° C., and further preferably from 50° C. through 60° C. When the Tg is 40° C. or greater, heat resistance storage stability of the resultant toner, and durability of the toner against stress, such as stirring inside a developing device, are improved, and filming resistance is also improved. When the Tg is 65° C. or less, the resultant toner is favorably deformed by heat and pressure applied during fixing, and therefore low temperature fixing ability is improved.

The amount of the polyester resin component A is preferably from 80 parts by mass through 90 parts by mass relative to 100 parts by mass of the toner.

—Modified Polyester Resin—

The modified polyester resin (hereinafter may be referred to as "modified polyester," or "polyester resin component C") is not particularly limited and may be appropriately selected depending on the intended purpose. Examples of the modified polyester resin include, but are not limited to, a reaction product between an active hydrogen group-containing compound and a polyester resin having a site reactive with the active hydrogen group-containing compound (in the present specification, this polyester resin may be referred to as a "prepolymer" or "polyester prepolymer").

The modified polyester is a polyester resin that is insoluble in tetrahydrofuran (THF). The polyester resin component that is insoluble to tetrahydrofuran (THF) reduces Tg and melt viscosity while maintaining low temperature fixing ability, and has a branched structure in a molecular skeleton thereof and a three-dimensional network structure of a molecular chain. Therefore, the modified polyester has rubber-like characteristics that it deforms at low temperatures but does not flow.

Since the polyester resin component C includes the active hydrogen group-containing compound and the sites reactive with active hydrogen group-containing compound, such sites behave as pseudo cross-linking points to enhance rubber-like characteristics of the amorphous polyester resin A. Therefore, a toner having excellent heat resistant storage stability and hot offset resistance can be produced.

—Active Hydrogen Group-Containing Compound—

The active hydrogen group-containing compound is a compound that can react with the polyester resin having a site reactive with the active hydrogen group-containing compound.

The active hydrogen group is not particularly limited and may be appropriately selected depending on the intended purpose. Examples thereof include, but are not limited to, a hydroxyl group (e.g., an alcoholic hydroxyl group and a phenolic hydroxyl group), an amino group, a carboxyl group, and a mercapto group. These may be used alone or in combination.

The active hydrogen group-containing compound is not particularly limited and may be appropriately selected depending on the intended purpose. When the polyester resin having a site reactive with the active hydrogen group-containing compound is a polyester resin including an isocyanate group, the active hydrogen group-containing compound is preferably amines because the amines can react with the polyester resin through elongation or cross-linking reaction to increase the molecular weight of the polyester resin.

The amines are not particularly limited and may be appropriately selected depending on the intended purpose. Examples thereof include, but are not limited to, diamine, trivalent or higher amine, amino alcohol, aminomercaptan, amino acid, and compounds obtained by blocking the amino group of any of these. These may be used alone or in combination.

Of these, diamine, and a mixture of diamine and a small amount of trivalent or higher amine are preferable.

The diamine is not particularly limited and may be appropriately selected depending on the intended purpose. Examples of the diamine include, but are not limited to, aromatic diamine, alicyclic diamine, and aliphatic diamine. The aromatic diamine is not particularly limited and may be appropriately selected depending on the intended purpose. Examples thereof include, but are not limited to, phenylene diamine, diethyltoluene diamine, and 4,4'-diaminodiphenylmethane. The alicyclic diamine is not particularly limited and may be appropriately selected depending on the intended purpose. Examples thereof include, but are not limited to, 4,4'-diamino-3,3'-dimethyldicyclohexylmethane, diaminocyclohexane, and isophoronediamine. The aliphatic diamine is not particularly limited and may be appropriately selected depending on the intended purpose. Examples thereof include, but are not limited to, ethylenediamine, tetramethylenediamine, and hexamethylenediamine.

The trivalent or higher amine is not particularly limited and may be appropriately selected depending on the intended purpose. Examples thereof include, but are not limited to, diethylenetriamine and triethylenetetraamine.

The amino alcohol is not particularly limited and may be appropriately selected depending on the intended purpose. Examples thereof include, but are not limited to, ethanol amine and hydroxyethyl aniline.

The aminomercaptan is not particularly limited and may be appropriately selected depending on the intended purpose. Examples thereof include, but are not limited to, aminoethylmercaptan and aminopropylmercaptan.

The amino acid is not particularly limited and may be appropriately selected depending on the intended purpose. Examples of the amino acid include, but are not limited to, aminopropionic acid and aminocaproic acid.

The products obtained by blocking the amino group are not particularly limited and may be appropriately selected depending on the intended purpose. Examples thereof include, but are not limited to, ketimine compounds and oxazolidine compounds each obtained by blocking the amino group with ketones, such as acetone, methyl ethyl ketone, and methyl isobutyl ketone.

—Polyester Resin having Site Reactive with Active Hydrogen Group-Containing Compound—

The polyester resin having a site reactive with the active hydrogen group-containing compound is not particularly limited and may be appropriately selected depending on the intended purpose. Examples thereof include, but are not limited to, an isocyanate group-containing polyester resin (hereinafter may be referred to as an "isocyanate group-containing polyester prepolymer"). The isocyanate group-containing polyester resin is not particularly limited and may be appropriately selected depending on the intended purpose. Examples thereof include, but are not limited to, a reaction product between an active hydrogen group-containing polyester resin and polyisocyanate, where the active hydrogen group-containing polyester resin is obtained through polycondensation between polyol and polycarboxylic acid.

The polyol is not particularly limited and may be appropriately selected depending on the intended purpose. Examples of the polyol include, but are not limited to, diol, trivalent or higher alcohol, and a mixture of diol and trivalent or higher alcohol. These may be used alone or in combination. Of these, diol, and a mixture of diol and a small amount of trivalent or higher alcohol are preferable.

The diol is not particularly limited and may be appropriately selected depending on the intended purpose. Examples of the diol include, but are not limited to, chain alkylene glycol, oxyalkylene group-containing diol, alicyclic diol, bisphenols, alkylene oxide adducts of alicyclic diol, and alkylene oxide adducts of bisphenols.

Examples of the chain alkylene glycol include, but are not limited to, ethylene glycol, 1,2-propyleneglycol, 1,3-propyleneglycol, 1,4-butanediol, and 1,6-hexanediol.

Examples of the oxyalkylene group-containing diol include, but are not limited to, diethylene glycol, triethylene glycol, dipropylene glycol, polyethylene glycol, polypropylene glycol, and polytetramethylene glycol.

Examples of the alicyclic diol include, but are not limited to, 1,4-cyclohexanedimethanol, and hydrogenated bisphenol A.

Examples of the bisphenols include, but are not limited to, bisphenol A, bisphenol F, and bisphenol S.

Examples of the alkylene oxide include, but are not limited to, ethylene oxide, propylene oxide, and butylene oxide.

The number of carbon atoms of the chain alkylene glycol is not particularly limited and may be appropriately selected depending on the intended purpose. The number of carbon atoms is preferably from 2 through 12.

Of these, C2-C12 chain alkylene glycol, alkylene oxide adducts of bisphenols, or both are preferable, and alkylene oxide adducts of bisphenols, and a mixture of an alkylene oxide adduct of bisphenol C2-C12 chain alkylene glycol are more preferable.

The trivalent or higher alcohol is not particularly limited and may be appropriately selected depending on the intended purpose. Examples thereof include, but are not limited to, trivalent or higher aliphatic alcohol, trivalent or higher polyphenols, and alkylene oxide adducts of trivalent or higher polyphenols.

The trivalent or higher aliphatic alcohol is not particularly limited and may be appropriately selected depending on the intended purpose. Examples thereof include, but are not limited to, glycerin, trimethylolethane, trimethylolpropane, pentaerythritol, and sorbitol.

The trivalent or higher polyphenols are not particularly limited and may be appropriately selected depending on the intended purpose. Examples thereof include, but are not limited to, trisphenol PA, phenol novolac, and cresol novolac.

Examples of the alkylene oxide adducts of trivalent or higher polyphenols include, but are not limited to, alkylene oxides (e.g., ethylene oxide, propylene oxide, and butylene oxide) of trivalent or higher polyphenols.

In the case where the mixture of the diol and the trivalent or higher alcohol is used, a mass ratio of the trivalent or higher alcohol to the diol (trivalent or higher alcohol/diol) is not particularly limited and may be appropriately selected depending on the intended purpose. The mass ratio thereof is preferably from 0.01% by mass through 10% by mass and more preferably from 0.01% by mass through 1% by mass.

The polycarboxylic acid is not particularly limited and may be appropriately selected depending on the intended purpose. Examples thereof include, but are not limited to, dicarboxylic acid, trivalent or higher carboxylic acid, and a mixture of dicarboxylic acid and trivalent or higher carboxylic acid. These may be used alone or in combination. Of these, dicarboxylic acid, and a mixture of dicarboxylic acid and a small amount of trivalent or higher polycarboxylic acid are preferable.

The dicarboxylic acid is not particularly limited and may be appropriately selected depending on the intended purpose. Examples of the dicarboxylic acid include, but are not limited to, divalent alkanoic acid, divalent alkenoic acid, and aromatic dicarboxylic acid.

The divalent alkanoic acid is not particularly limited and may be appropriately selected depending on the intended purpose. Examples thereof include, but are not limited to, succinic acid, adipic acid, and sebacic acid.

The divalent alkenoic acid is not particularly limited and may be appropriately selected depending on the intended purpose. The divalent alkenoic acid is preferably C4-C20 divalent alkenoic acid. The C4-C20 divalent alkenoic acid is not particularly limited and may be appropriately selected depending on the intended purpose. Examples thereof include, but are not limited to, maleic acid and fumaric acid.

The aromatic dicarboxylic acid is not particularly limited and may be appropriately selected depending on the intended purpose. The aromatic dicarboxylic acid is preferably C8-C20 aromatic dicarboxylic acid. The C8-C20 aromatic dicarboxylic acid is not particularly limited and may be appropriately selected depending on the intended purpose. Examples thereof include, but are not limited to, phthalic acid, isophthalic acid, terephthalic acid, and naphthalene dicarboxylic acid.

The trivalent or higher carboxylic acid is not particularly limited and may be appropriately selected depending on the intended purpose. Examples thereof include, but are not limited to, trivalent or higher aromatic carboxylic acid.

The trivalent or higher aromatic carboxylic acid is not particularly limited and may be appropriately selected depending on the intended purpose. The trivalent or higher aromatic carboxylic acid is preferably C9-C20 trivalent or higher aromatic carboxylic acid. The C9-C20 trivalent or higher aromatic carboxylic acid is not particularly limited and may be appropriately selected depending on the intended purpose. Examples thereof include, but are not limited to, trimellitic acid and pyromellitic acid.

As the polycarboxylic acid, acid anhydride or lower alkyl ester of dicarboxylic acid, trivalent or higher carboxylic acid, or a mixture of dicarboxylic acid and trivalent or higher carboxylic acid may be used.

The lower alkyl ester is not particularly limited and may be appropriately selected depending on the intended purpose. Examples thereof include, but are not limited to, methyl ester, ethyl ester, and isopropyl ester.

In the case where the mixture of the dicarboxylic acid and the trivalent or higher carboxylic acid is used, a mass ratio of the trivalent or higher carboxylic acid to the dicarboxylic acid (trivalent or higher carboxylic acid/dicarboxylic acid) is not particularly limited and may be appropriately selected depending on the intended purpose. The mass ratio thereof is preferably from 0.01% by mass through 10% by mass and more preferably from 0.01% by mass through 1% by mass.

When the polyol and the polycarboxylic acid are allowed to undergo polycondensation, an equivalent ratio of hydroxyl groups of the polyol to carboxyl groups of polycarboxylic acid (hydroxyl groups of polyol/carboxyl groups of polycarboxylic acid) is not particularly limited and may be appropriately selected depending on the intended purpose. The equivalent ratio thereof is preferably from 1 through 2, more preferably from 1 through 1.5, and particularly preferably from 1.02 through 1.3.

The amount of the constitutional unit derived from polyol in the isocyanate group-containing polyester prepolymer is not particularly limited and may be appropriately selected depending on the intended purpose. The amount thereof is preferably from 0.5% by mass through 40% by mass, more preferably from 1% by mass through 30% by mass, and particularly preferably from 2% by mass through 20% by mass.

When the amount thereof is less than 0.5% by mass, the resultant toner has poor hot offset resistance and therefore it may be difficult to achieve both satisfactory heat resistant storage stability and satisfactory low temperature fixing ability of the toner. When the amount thereof is greater than 40% by mass, the resultant toner may have poor low temperature fixing ability.

The polyisocyanate is not particularly limited and may be appropriately selected depending on the intended purpose. Examples thereof include, but are not limited to, aliphatic diisocyanate, alicyclic diisocyanate, aromatic diisocyanate, aromatic aliphatic diisocyanate, isocyanurate, and products obtained by blocking any of the above-polyisocyanates with a phenol derivative, oxime, and caprolactam.

The aliphatic diisocyanate is not particularly limited and may be appropriately selected depending on the intended purpose. Examples thereof include, but are not limited to, tetramethylene diisocyanate, hexamethylene diisocyanate, methyl 2,6-diisocyanatocaproate, octamethylene diisocyanate, decamethylene diisocyanate, dodecamethylene diisocyanate, tetradecamethylene diisocyanate, trimethylhexane diisocyanate, and tetramethylhexane diisocyanate.

The alicyclic diisocyanate is not particularly limited and may be appropriately selected depending on the intended purpose. Examples thereof include, but are not limited to, isophorone diisocyanate and cyclohexylmethane diisocyanate.

The aromatic diisocyanate is not particularly limited and may be appropriately selected depending on the intended purpose. Examples thereof, but are not limited to, include tolylene diisocyanate, diisocyanatodiphenyl methane, 1,5-naphthylenediisocyanate, 4,4'-diisocyanatodiphenyl, 4,4'-diisocyanato-3,3'-dimethyldiphenyl, 4,4'-diisocyanato-3-methyldiphenylmethane, and 4,4'-diisocyanato-diphenyl ether.

The aromatic aliphatic diisocyanate is not particularly limited and may be appropriately selected depending on the intended purpose. Examples thereof include, but are not limited to, α,α,α',α'-tetramethylxylylene diisocyanate.

The isocyanurates are not particularly limited and may be appropriately selected depending on the intended purpose. Examples thereof include, but are not limited to, tris(isocyanatoalkyl)isocyanurate and tris(isocyanatocycloalkyl)isocyanurate. These may be used alone or in combination.

When the polyisocyanate and the hydroxyl group-containing polyester resin are allowed to react, an equivalent ratio of isocyanate groups of the polyisocyanate to hydroxyl groups of the polyester resin (NCO/OH) is not particularly limited and may be appropriately selected depending on the intended purpose. The equivalent ratio thereof is preferably from 1 through 5, more preferably from 1.2 through 4, and particularly preferably from 1.5 through 2.5. When the equivalent ratio is less than 1, the resultant toner may have poor hot offset resistance. When the equivalent ratio is greater than 5, the resultant toner may have poor low temperature fixing ability.

The amount of the constitutional unit derived from the polyisocyanate in the isocyanate group-containing polyester prepolymer is not particularly limited and may be appropriately selected depending on the intended purpose. The amount thereof is preferably from 0.5% by mass through 40% by mass, more preferably from 1% by mass through 30% by mass, and particularly preferably from 2% by mass through 20% by mass. When the amount thereof is less than 0.5% by mass, the resultant toner may have poor hot offset resistance. When the amount thereof is greater than 40% by mass, the resultant toner may have poor low temperature fixing ability.

The average number of isocyanate groups per molecule of the isocyanate group-containing polyester prepolymer is not particularly limited and may be appropriately selected depending on the intended purpose. The average number thereof is preferably 1 or greater, more preferably from 1.5 through 3, and particularly preferably from 1.8 through 2.5. When the average number thereof is less than 1, the molecular weight of the resultant modified polyester resin becomes small, and the resultant toner may have poor hot offset resistance.

The modified polyester resin can be produced by, for example, the one-shot method. As one example, a production method of a urea-modified polyester resin will be described.

First, polyol and polycarboxylic acid are heated to a temperature ranging from 150° C. through 280° C. in the presence of a catalyst, such as tetrabutoxytitanate or dibutyl tin oxide, optionally while reducing the pressure to remove water generated, to thereby obtain a hydroxyl group-containing polyester resin. Next, the hydroxyl group-containing polyester resin and polyisocyanate are allowed to react at a temperature ranging from 40° C. through 140° C., to thereby obtain an isocyanate group-containing polyester prepolymer. The isocyanate group-containing polyester prepolymer and amine are allowed to react at a temperature ranging from 0° C. through 140° C., to thereby obtain a urea-modified polyester resin.

The number average molecular weight (Mn) of the modified polyester resin is not particularly limited and may be appropriately selected depending on the intended purpose. The Mn of the modified polyester resin as measured by gel permeation chromatography (GPC) is preferably from 1,000 through 10,000 and more preferably from 1,500 through 6,000.

The weight average molecular weight of the modified polyester resin is not particularly limited and may be appropriately selected depending on the intended purpose. The weight average molecular weight of the modified polyester resin as measured by gel permeation chromatography (GPC) is preferably 20,000 or greater but 1,000,000 or less.

When the weight average molecular weight thereof is 20,000 or greater, the resultant toner can avoid a disadvantage that the toner tends to flow at a low temperature to result in poor heat resistant storage stability or a disadvantage that the viscosity of the toner as melted becomes low to result in poor hot offset resistance.

When the hydroxyl group-containing polyester resin and polyisocyanate are allowed to react or when the isocyanate group-containing polyester prepolymer and amines are allowed to react, a solvent may be used according to the necessity.

The solvent is not particularly limited and may be appropriately selected depending on the intended purpose. Examples of the solvent include, but are not limited to, solvents inert to an isocyanate group, such as aromatic solvents, ketones, esters, amides, and ethers. Examples of the aromatic solvents include, but are not limited to, toluene and xylene. Examples of the ketones include, but are not limited to, acetone, methyl ethyl ketone, and methyl isobutyl ketone. Examples of the esters include, but are not limited to, ethyl acetate. Examples of the amines include, but are not limited to, dimethylformamide and dimethylacetamide. Examples of the ethers include, but are not limited to, tetrahydrofuran.

The glass transition temperature of the modified polyester resin is preferably −60° C. or higher but 0° C. or lower, and more preferably −40° C. or higher but −20° C. or lower.

When the glass transition temperature is −60° C. or higher, the resultant toner can avoid a disadvantage that flow at low temperatures of the toner cannot be prevented to impair heat resistant storage stability and filming resistance.

When the glass transition temperature is 0° C. or lower, the resultant toner can avoid a disadvantage that the toner cannot be sufficiently deformed by heat and pressure applied during fixing to impair low temperature fixing ability.

The amount of the modified polyester is not particularly limited and may be appropriately selected depending on the intended purpose. The amount thereof is preferably from 1 part by mass through 15 parts by mass and more preferably from 5 parts by mass through 10 parts by mass, relative to 100 parts by mass of the toner.

The molecular structures of the polyester resin components A and C can be confirmed by, for example, solution or solid NMR spectroscopy, X-ray diffraction, GC/MS, LC/MS, or IR spectroscopy.

A simple confirmation method thereof is a method where a compound that does not have absorption at 965±10 $cm^{-1}$ or 990±10 $cm^{-1}$ owing to δCH (out-of-plane bending) of olefin presented on an infrared absorption spectrum thereof is detected as an amorphous polyester resin.

—Crystalline Polyester—

The crystalline polyester resin (hereinafter may be referred to as "crystalline polyester" or "polyester resin component D") is not particularly limited and may be appropriately selected depending on the intended purpose. Examples thereof include, but are not limited to, a crystalline polyester resin obtained through reaction between polyol and polycarboxylic acid.

The crystalline polyester resin has high crystallinity and therefore exhibits such thermofusion properties that the viscosity thereof reduces sharply at a temperature near a fixing onset temperature.

Since the crystalline polyester resin having the above properties is used together with the amorphous polyester resin, a toner having both excellent heat resistant storage stability and excellent low temperature fixing ability can be obtained. Excellent heat resistant storage stability by virtue of crystallinity is exhibited at a temperature just below a melt onset temperature. Sharp reduction in viscosity (sharp melt) occurs as a result of fusion of the crystalline polyester resin at the melt onset temperature. The crystalline polyester resin melts the amorphous polyester resin to significantly reduce the viscosity of the toner to be fixed. Moreover, an excellent release width (a difference between the minimum fixing temperature and the hot offset onset temperature) is obtained.

In the present disclosure, the term "crystalline polyester resin" means a resin obtained through reaction between polyol and polycarboxylic acid as described above. A modified polyester resin, such as the above prepolymer, and a resin obtained through at least one of cross-linking and elongation reaction of the prepolymer do not belonge to the crystalline polyester resin.

—Polyol—

The polyol is not particularly limited and may be appropriately selected depending on the intended purpose. Examples thereof include, but are not limited to, diol and trivalent or higher polyol.

Examples of the diol include, but are not limited to, saturated aliphatic diol.

Examples of the saturated aliphatic diol include, but are not limited to, straight-chain saturated aliphatic diol and branched-chain saturated aliphatic diol. These may be used alone or in combination. Of these, a straight-chain saturated aliphatic diol is preferable, and C2-C12 straight-chain saturated aliphatic diol is more preferable, because these can improve crystallinity of the resultant crystalline polyester resin and prevent reduction of the melting point thereof.

Examples of the saturated aliphatic diol include, but are not limited to, ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanediol.

Of these, ethylene glycol, 1,4-butanediol, 1,6-hexanediol, 1,8-octanediol, 1,10-decanediol, and 1,12-dodecanediol are preferable because the resultant crystalline polyester resin can have high crystallinity and excellent sharp melt properties.

Examples of the trivalent or higher alcohol (polyol) include, but are not limited to, glycerin, trimethylolethane, trimethylolpropane, and pentaerythritol.

—Polycarboxylic Acid—

The polycarboxylic acid is not particularly limited and may be appropriately selected depending on the intended purpose. Examples of the polycarboxylic acid include, but are not limited to, divalent carboxylic acid and trivalent or higher carboxylic acid.

Examples of the divalent carboxylic acid include, but are not limited to: saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acid (e.g., dibasic acid), such as phthalic acid, isophthalic acid, terephthalic acid, naphthalene-2,6-dicarboxylic acid, malonic acid, and mesaconic acid; and anhydrides and lower alkyl esters (the number of carbon atoms: from 1 through 3) of the above-listed dicarboxylic acids.

Examples of the trivalent or higher carboxylic acid include, but are not limited to, 1,2,4-benzenetricarboxylic acid, 1,2,5-benzenetricarboxylic acid, 1,2,4-naphthalenetricarboxylic acid, anhydrides thereof, and lower alkyl esters (the number of carbon atoms: from 1 through 3) thereof.

In addition to the saturated aliphatic dicarboxylic acid and the aromatic dicarboxylic acid, sulfonic acid group-containing dicarboxylic acid may be included as the polycarboxylic acid. Moreover, dicarboxylic acid having a double bond may be included in addition to the saturated aliphatic dicarboxylic acid or the aromatic dicarboxylic acid. These may be used alone or in combination.

The crystalline polyester resin is preferably formed from C4-C12 straight-chain saturated aliphatic dicarboxylic acid and C2-C12 straight-chain saturated aliphatic diol. In other words, the crystalline polyester resin preferably includes a constitutional unit derived from C4-C12 saturated aliphatic dicarboxylic acid and a constitutional unit derived from C2-C12 saturated aliphatic diol. Such a crystalline polyester resin is preferable because the crystalline polyester has high crystallinity and sharp melt properties, and therefore the resultant toner exhibits excellent low temperature fixing ability.

In the present disclosure, the presence of the crystallinity of the crystalline polyester resin can be confirmed by a crystal analysis X-ray diffractometer (e.g., X'Pert Pro MRD, available from Phillips). A measuring method will be described below.

First, a target sample is ground by a motor to form sample powder, and the sample powder is uniformly applied onto a sample holder. The sample holder is then set to the diffractometer to perform measurement to obtain a diffraction spectrum.

When the obtained diffraction peaks include a peak that has the largest peak intensity among the peaks obtained in the range of $20° < 2\theta < 25°$ and has a peak half value width of 2.0 or less, it is determined that the sample has crystallinity.

In contrast to the crystalline polyester resin, the polyester resin that does not exhibit the above diffraction peak is referred to as an amorphous polyester resin in the present disclosure.

The measuring conditions of X-ray diffraction will be described below.

[Measuring Conditions]

Tension kV: 45 kV
Current: 40 mA
MPSS
Upper
Gonio
Scan mode: continuous
Start angle: 3°
End angle: 35°
Angle Step: 0.02°
Lucident beam optics
Divergence slit: Div slit ½
Deflection beam optics
Anti scatter slit: As Fixed ½
Receiving slit: Prog rec slit The melting point of the crystalline polyester resin is not particularly limited and may be appropriately selected depending on the intended purpose. The melting point of the crystalline polyester resin is preferably 60° C. or higher but 80° C. or lower.

When the melting point thereof is 60° C. or higher, the crystalline polyester resin can avoid a disadvantage that the crystalline polyester resin tends to melt at a low temperature to degrade heat resistant storage stability of the resultant toner. When the melting point of the crystalline polyester resin is 80° C. or lower, the crystalline polyester resin can avoid a disadvantage that the crystalline polyester resin melts insufficiently by heat applied during fixing to degrade low temperature fixing ability of the resultant toner.

The molecular weight of the crystalline polyester resin is not particularly limited and may be appropriately selected depending on the intended purpose.

The weight average molecular weight (Mw) of an orthodichlorobenzene-soluble component of the crystalline polyester resin as measured by GPC is preferably from 3,000 through 30,000 and more preferably from 5,000 through 15,000.

The number average molecular weight (Mn) of the orthodichlorobenzene-soluble component of the crystalline polyester resin as measured by GPC is preferably from 1,000 through 10,000 and more preferably from 2,000 through 10,000.

A molecular weight ratio (Mw/Mn) of the crystalline polyester resin is preferably from 1.0 through 10 and more preferably from 1.0 through 5.0.

These are preferable because a toner including the crystalline polyester resin having a sharp molecular weight distribution and a low molecular weight has excellent low temperature fixing ability, and also heat resistant storage stability of the toner is degraded when the toner includes a large amount of the low-molecular-weight component.

The acid value of the crystalline polyester resin is not particularly limited and may be appropriately selected depending on the intended purpose. In order to achieve desirable low temperature fixing ability considering affinity between paper and the crystalline resin, the acid value of the crystalline polyester resin is preferably 5 mgKOH/g or greater and more preferably 10 mgKOH/g or greater. In order to improve hot offset resistance, the acid value of the crystalline polyester resin is preferably 45 mgKOH/g or less.

The hydroxyl value of the crystalline polyester resin is not particularly limited and may be appropriately selected depending on the intended purpose. In order to achieve desirable low temperature fixing ability and favorable charging properties, the hydroxyl value of the crystalline polyester resin is preferably from 0 mgKOH/g through 50 mgKOH/g and more preferably from 5 mgKOH/g through 50 mgKOH/g.

The molecular structure of the crystalline polyester resin can be confirmed by, for example, solution or solid NMR spectroscopy, X-ray diffraction, GC/MS, LC/MS, or IR spectroscopy. A simple confirmation method thereof is a method where a compound having absorption at 965±10 $cm^{-1}$ or 990±10 $cm^{-1}$ owing to δCH (out-of-plane bending) of olefin presented on an infrared absorption spectrum thereof is detected as a crystalline polyester resin.

The amount of the crystalline polyester resin is not particularly limited and may be appropriately selected depending on the intended purpose. The amount of the crystalline polyester resin is preferably from 3 parts by mass through 20 parts by mass and more preferably from 5 parts by mass through 15 parts by mass, relative to 100 parts by mass of the toner. When the amount thereof is 3 parts by mass or greater, the resultant toner can avoid a disadvantage of poor low temperature fixing ability arising because the crystalline polyester resin has poor sharp melt properties. When the amount thereof is 20 parts by mass or less, the resultant toner can avoid disadvantages that heat resistant storage stability is low and image fogging easily occurs.

<<Colorant>>

The colorant is not particularly limited and may be appropriately selected depending on the intended purpose. Examples of the colorant include, but are not limited to, carbon black, a nigrosine dye, iron black, naphthol yellow S, Hansa yellow (10 G, 5 G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), vulcan fast yellow (5 G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, Bon maroon light, Bon maroon medium, eosin lake, rhodamine lake B, rhodamine lake Y, alizarin lake, thio indigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS, BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

The amount of the colorant is not particularly limited and may be appropriately selected depending on the intended purpose. The amount of the colorant is preferably from 1 part by mass through 15 parts by mass and more preferably from 3 parts by mass through 10 parts by mass, relative to 100 parts by mass of the toner.

The colorant may also be used as a master batch in which the colorant forms a composite with a resin. Examples of a resin for production of the master batch or kneading together with the master batch include, in addition to the above other polyester resins, polymers of styrene or substituted styrene (e.g., polystyrene, poly(p-chlorostyrene), and polyvinyl toluene), styrene-based copolymers (e.g., styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleic acid ester copolymer), polymethyl methacrylate, polybutyl methacrylate, polyvinyl chloride, polyvinyl acetate, polyethylene, polypropylene, polyester, an epoxy resin, an epoxy polyol resin, polyurethane, polyamide, polyvinyl butyral, a polyacrylic acid resin, rosin, modified rosin, a terpene resin, an aliphatic or alicyclic hydrocarbon resin, an aromatic petroleum resin, chlorinated paraffin, and paraffin wax. These may be used alone or in combination.

The master batch can be obtained by applying high shear force to the resin for a master batch and the colorant, followed by mixing and kneading. In order to enhance interaction between the colorant and the resin, an organic solvent may be used. Moreover, a so-called flashing method is preferably used, as a wet cake of the colorant can be directly used without drying. The flashing method is a method where an aqueous paste containing a colorant is mixed or kneaded with a resin and an organic solvent, the colorant is transferred to the resin, and the moisture and the organic solvent are removed. For the mixing and kneading, a high-shearing disperser (e.g., a three-roll mill) is preferably used.

<<Wax>>

The wax (release agent) is not particularly limited and may be appropriately selected from wax known in the art depending on the intended purpose. Examples thereof include, but are not limited to, natural wax and synthetic wax. These may be used alone or in combination.

Examples of the natural wax include, but are not limited to: vegetable wax, such as carnauba wax, cotton wax, and Japanese wax; animal wax, such as bees wax and lanolin wax; mineral wax, such as ozokerite and ceresin; and petroleum wax, such as paraffin, microcrystalline wax, and petrolatum wax.

Examples of the synthetic wax include, but are not limited to: synthetic hydrocarbon wax, such as Fischer-Tropsch wax, polyethylene, and polypropylene; fatty acid amide-based compounds, such as ester, ketone, ether, 12-hydroxystearic acid amide, stearic acid amide, phthalimide anhydride, and chlorinated hydrocarbon; homopolymers or copolymers of polyacrylate, which is a low-molecular-weight crystalline polymer resin, such as poly-n-stearyl methacrylate or poly-n-lauryl methacrylate (e.g., a copolymer of n-stearyl acrylate-ethyl methacrylate); and a crystalline polymer having a long-chain alkyl group at a side chain thereof.

Of these, hydrocarbon-based wax, such as paraffin wax, microcrystalline wax, Fischer-Tropsch wax, polyethylene wax, and polypropylene wax, is preferable.

The melting point of the release agent is not particularly limited and may be appropriately selected depending on the intended purpose. The melting point of the release agent is preferably 60° C. or higher but 80° C. or lower. When the melting point thereof is 60° C. or higher, the release agent can prevent a disadvantage that the release agent easily melts at a low temperature to degrade heat resistant storage stability of the resultant toner. When the melting point thereof is 80° C. or lower, the release agent can prevent a disadvantage that, even in the fixing temperature region in which the resin melts, the release agent melts insufficiently to cause fixing offset to cause defects in the resultant image.

The amount of the release agent is not particularly limited and may be appropriately selected depending on the intended purpose. The amount of the release agent is preferably from 2 parts by mass through 10 parts by mass and more preferably from 3 parts by mass through 8 parts by mass, relative to 100 parts by mass of the toner. When the amount of the release agent is 2 parts by mass or greater, the resultant toner can avoid a disadvantage that hot offset resistance and low temperature fixing ability during fixing are poor. When the amount of the release agent is 10 parts by mass or less, the resultant toner can avoid disadvantages that heat resistant storage stability is low and image fogging easily occurs.

The above other components are not particularly limited as long as the components are components typically used for toner base particles. The toner base particles may include appropriately selected other components depending on the intended purpose.

The amount of the above other components is not particularly limited and may be appropriately selected depending on the intended purpose, as long as such an amount of the components does not adversely affect the properties of the resultant toner.

<Other Components>

The above other components are not particularly limited and may be appropriately selected depending on the intended purpose, as long as the components are components used for a typical toner. Examples thereof include, but are not limited to, a charge controlling agent, external additives, a flowability improving agent, a cleanability improving agent, and a magnetic material.

—Charge Controlling Agent—

The charge controlling agent is not particularly limited and may be appropriately selected depending on the intended purpose. Examples of the charge controlling agent include, but are not limited to, a nigrosine-based dye, a triphenylmethane-based dye, a chromium-containing metal complex dye, a molybdic acid chelate pigment, a rhodamine-based dye, alkoxy-based amine, a quaternary ammonium salt (including a fluorine-modified quaternary ammonium salt), alkylamide, phosphorus or a compound thereof, tungsten or a compound thereof, a fluorosurfactant, a metal salt of salicylic acid, and a metal salt of a salicylic acid derivative.

Examples of a commercial product of the charge controlling agent include, but are not limited to: nigrosine-based dye BONTRON 03, quaternary ammonium salt BONTRON P-51, metal-containing azo dye BONTRON S-34, oxynaphthoic acid-based metal complex E-82, salicylic acid-based metal complex E-84, and phenol condensate E-89 (all available from ORIENT CHEMICAL INDUSTRIES CO., LTD.); quaternary ammonium salt molybdenum complex TP-302 and TP-415 (both available from Hodogaya Chemical Co., Ltd.); and LRA-901 and boron complex LR-147 (both available from Japan Carlit Co., Ltd.).

The amount of the charge controlling agent cannot be determined unconditionally because the amount thereof is determined depending on the binder resin for use, the presence or absence of optionally used additives, and a toner production method including a dispersion method. The amount of the charge controlling agent is preferably from 0.1 parts by mass through 10 parts by mass and more preferably from 0.2 parts by mass through 5 parts by mass, relative to 100 parts by mass of the binder resin. When the amount thereof is greater than 10 parts by mass, the resultant toner has excessive chargeability to impair the effect of the main charge controlling agent. Static attraction between the toner and a developing roller increases to potentially cause low flowability of a developer and low image density. The charge controlling agent may be added to a toner by melt-kneading with a master batch or a resin, followed by being dissolved or dispersed. The charge controlling agent may be added directly into an organic solvent when toner materials are dissolved or dispersed in the organic solvent. The charge controlling agent may be added to and fixed on surfaces of toner particles, after forming the toner particles.

—External Additives—

The external additives are not particularly limited and may be appropriately selected depending on the intended purpose.

Examples of the external additives include, but are not limited to, silica particles, hydrophobic silica, fatty acid metal salt (e.g., zinc stearate and aluminium stearate), metal oxides (e.g., titania, alumina, tin oxide, and antimony oxide), and fluoropolymer. These may be used alone or in combination. Of these, hydrophobic-treated inorganic particles are preferable.

Examples of the silica particles include, but are not limited to, R972, R974, RX200, RY200, R202, R805, and R812 (all available from NIPPON AEROSIL CO., LTD.).

Examples of the titania particles include, but are not limited to: P-25 (available from NIPPON AEROSIL CO., LTD.); STT-30 and STT-65C-S (both available from Titan Kogyo, Ltd.); TAF-140 (available from Fuji Titanium Industry Co., Ltd.); and MT-150W, MT-500B, MT-600B, and MT-150A (all available from TAYCA CORPORATION).

Examples of the hydrophobic-treated titanium oxide particles include, but are not limited to: T-805 (available from NIPPON AEROSIL CO., LTD.); STT-30A and STT-65S-S (both available from Titan Kogyo, Ltd.); TAF-500T and TAF-1500T (both available from Fuji Titanium Industry Co., Ltd.); MT-100S and MT-100T (both available from TAYCA CORPORATION); and IT-S (available from ISHIHARA SANGYO KAISHA, LTD.).

The hydrophobic-treated oxide particles, hydrophobic-treated silica particles, hydrophobic-treated titania particles, and hydrophobic-treated alumina particles can be obtained by, for example, treating hydrophilic particles with a silane coupling agent, such as methyltrimethoxysilane, methyltriethoxysilane, or octyltrimethoxysilane. It is also preferable to use silicone oil-treated oxide particles or inorganic particles obtained by treating inorganic particle with silicone oil, optionally by application of heat.

Examples of the silicone oil include, but are not limited to, dimethyl silicone oil, methylphenyl silicone oil, chlorophenyl silicone oil, methyl hydrogen silicone oil, alkyl-modified silicone oil, fluorine-modified silicone oil, polyether-modified silicone oil, alcohol-modified silicone oil, amino-modified silicone oil, epoxy-modified silicone oil, epoxy/polyether-modified silicone oil, phenol-modified silicone oil, carboxyl-modified silicone oil, mercapto-modified silicone oil, methacryl-modified silicone oil, and α-methylstyrene-modified silicone oil.

The primary average particle diameter of the external additives is not particularly limited and may be appropriately selected depending on the intended purpose. The primary average particle diameter thereof is preferably 100 nm or less, more preferably from 1 nm through 100 nm, even more preferably from 3 nm through 70 nm, and particularly preferably from 5 nm through 70 nm. When the average primary particle diameter is within the above range, the resultant toner can avoid disadvantages that the inorganic particles are buried in the toner particles not to easily exhibit the functions thereof, and the surface of a photoconductor is unevenly scratched.

The external additives preferably include at least one kind of the hydrophobic-treated inorganic particles having an average primary particle diameter of 20 nm or less and at least one kind of the inorganic particles having an average primary particle diameter of 30 nm or greater.

The BET specific surface area of the external additives is preferably from 20 $m^2/g$ through 500 $m^2/g$.

The amount of the external additives is not particularly limited and may be appropriately selected depending on the intended purpose. The amount thereof is preferably from 0.1 parts by mass through 5 parts by mass and more preferably from 0.3 parts by mass through 3 parts by mass, relative to 100 parts by mass of the toner.

—Flowability Improving Agent—

The flowability improving agent is not particularly limited and may be appropriately selected depending on the intended purpose, as long as the flowability improving agent can be used for a surface treatment to increase hydrophobicity, and can prevent degradation of flowing properties and charging properties in a high-humidity environment. Examples of the flowability improving agent include, but are not limited to, a silane coupling agent, a silylating agent, a fluoroalkyl group-containing silane coupling agent, an organic titanate-based coupling agent, an aluminium-based coupling agent, silicone oil, and modified silicone oil.

The silica and the titanium oxide are particularly preferably treated with the flowability improving agent, and used as hydrophobic silica and hydrophobic titanium oxide, respectively.

—Cleanability Improving Agent—

The cleanability improving agent is not particularly limited and may be appropriately selected depending on the intended purpose, as long as the cleanability improving agent is an agent added to the toner in order to remove a developer remaining on a photoconductor or a primary transfer medium after transferring. Examples of the cleanability improving agent include, but are not limited to: fatty acid metal salts of, for example, stearic acid, such as zinc stearate and calcium stearate; and polymer particles produced by soap-free emulsification polymerization, such as polymethyl methacrylate particles and polystyrene particles.

The polymer particles are preferably particle particles having a relatively narrow particle size distribution. The polymer particles having a volume average particle diameter of from 0.01 μm through 1 μm are preferable.

—Magnetic Material—

The magnetic material is not particularly limited and may be appropriately selected depending on the intended purpose. Examples thereof include, but are not limited to, iron powder, magnetite, and ferrite. Of these, a white magnetic material is preferable in view of color tone.

The glass transition temperature (Tg1st) of the toner in the first heating as measured by differential scanning calorimetry (DSC) is preferably from 40° C. through 65° C.

The glass transition temperature (Tg1st) of the tetrahydrofuran (THF)-insoluble component of the toner in the first heating as measured by DSC is preferably from −45° C. through 5° C.

The glass transition temperature (Tg2nd) of the THE-soluble component of the toner in the second heating as measured by DSC is preferably from 20° C. through 65° C.

The glass transition temperature (Tg1st) of the toner in the first heating as measured by differential scanning calorimetry (DSC) and the glass transition temperature (Tg2nd) in the second heating as measured by DSC preferably satisfy the relationship Tg1st-Tg2nd≥10 [° C.] because low temperature fixing ability and heat resistant storage stability of the toner can be both improved.

The glass transition temperature of the toner can be measured by means of, for example, a differential scanning calorimeter (DSC-60, available from Shimadzu Corporation).

In one exemplary measurement method, DSC curves are measured by means of the differential scanning calorimeter. A DSC curve in the first heating is selected from the obtained DSC curves using an analysis program, and the glass transition temperature Tg1st in the first heating can be determined using the endothermic shoulder temperature stored in the analysis program. A DSC curve in the second heating is selected, and the glass transition temperature Tg2nd in second heating can be determined using the endothermic shoulder temperature.

(Developer)

The developer of the present disclosure includes at least the toner of the present disclosure, and further includes appropriately selected other components, such as a carrier, according to the necessity. The developer may be a one-component developer or a two-component developer. When the developer is used for the recent high-speed printer responding to increased information processing speed, a two-component developer is preferable because the service life of the developer becomes longer.

<Carrier>

The carrier is not particularly limited and may be appropriately selected depending on the intended purpose. The carrier is preferably a carrier particle that includes a core and a resin layer covering the core.

—Core—

The material of the core is not particularly limited and may be appropriately selected depending on the intended purpose. Examples thereof include, but are not limited to, a manganese-strontium-based material of from 50 emu/g through 90 emu/g and a manganese-magnesium-based material of from 50 emu/g through 90 emu/g. In order to ensure image density, use of a high-magnetic material, such as iron powder of 100 emu/g or greater or magnetite of from 75 emu/g through 120 emu/g, is preferable. Moreover, use of a low-magnetic material, such as a copper-zinc material of from 30 emu/g through 80 emu/g, is preferable because it is possible to reduce impacts of the developer in the form of brush applied to a photoconductor, and the low-magnetic material is advantageous for high image quality. These may be used alone or in combination.

The volume average particle diameter of the cores is not particularly limited and may be appropriately selected depending on the intended purpose. The volume average particle diameter thereof is preferably from 10 μm through 150 μm and more preferably from 40 μm through 100 μm. When the volume average particle diameter thereof is less than 10 μm, the proportion of minute particles in the carrier increases and magnetization per particle decreases to cause carrier scattering. When the volume average particle diameter thereof is greater than 150 μm, the specific surface area of the carrier decreases to cause toner scattering, and reproducibility, particularly of solid image areas, may be impaired in a full-color image including a large area of solid images.

The toner of the present disclosure may be mixed with the carrier and used as a two-component developer.

The amount of the carrier in the two-component developer is not particularly limited and may be appropriately selected depending on the intended purpose. The amount of the carrier is preferably from 90 parts by mass through 98 parts by mass and more preferably from 93 parts by mass through 97 parts by mass, relative to 100 parts by mass of the two-component developer.

The developer of the present disclosure can be suitably used for image formation according to any of known electrophotographic methods, such as a magnetic one-component developing method, a non-magnetic one-component developing method, and a two-component developing method.

(Method for Producing Toner)

The method of the present disclosure for producing a toner is a method for producing the above toner.

The method for producing a toner includes a composite particle forming step and a removing step, and may further include other steps according to the necessity.

<Composite Particle Forming Step>

The composite particle forming step is a step including depositing resin particles on surfaces of toner base particles to form composite particles.

Examples of a formation method of the composite particles include, but are not limited to, a known dissolution suspension method where an oil phase including components of toner base particles, such as a binder resin, a colorant, and wax, is dispersed in an aqueous medium including resin particles to granulate composite particles.

One example of the dissolution suspension method is a method where the prepolymer is reacted with the curing agent through at least one of elongation reaction and cross-linking reaction to generate a polyester resin to form composite particles.

The method as described above includes preparation of an aqueous medium, preparation of an oil phase including toner base particle materials, at least one of emulsification and dispersion of the toner base particle materials, and removal of the organic solvent.

—Preparation of Aqueous Medium (Aqueous Phase)—

The preparation of the aqueous medium can be performed by, for example, dispersing resin particles in an aqueous medium. The amount of the resin particles added to the aqueous medium is not particularly limited and may be appropriately selected depending on the intended purpose. The amount of the resin particles is preferably from 0.5 parts by mass through 10 parts by mass relative to 100 parts by mass of the aqueous medium.

The aqueous medium is not particularly limited and may be appropriately selected depending on the intended purpose. Examples of the aqueous medium include, but are not limited to, water, solvents miscible with water, and mixtures thereof. These may be used alone or in combination. Of these, water is preferable.

The solvent miscible with water is not particularly limited and may be appropriately selected depending on the intended purpose. Examples thereof include, but are not limited to, alcohol, dimethylformamide, tetrahydrofuran, cellosolves, and lower ketones. Examples of the alcohol include, but are not limited to, methanol, isopropanol, and ethylene glycol. Examples of the lower ketones include, but are not limited to, acetone and methyl ethyl ketone.

—Preparation of Oil Phase—

The preparation of the oil is performed by dissolving or dispersing, in an organic solvent, the toner base particle materials, including the binder resin, the colorant, and the wax, and optionally a curing agent.

The organic solvent is not particularly limited and may be appropriately selected depending on the intended purpose. The organic solvent is preferably an organic solvent having a boiling point of lower than 150° C. because such an organic solvent is easily removed.

Examples of the organic solvent having a boiling point of lower than 150° C. include, but are not limited to, toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone. These may be used alone or in combination. Of these, ethyl acetate, toluene, xylene, benzene, methylene chloride, 1,2-dichloroethane, chloroform, and carbon tetrachloride are preferable, with ethyl acetate being more preferable.

—Emulsifying or Dispersing—

The emulsifying or dispersing of the toner particles can be performed by dispersing an oil phase including the toner materials in the aqueous medium. When the toner particles are emulsified or dispersed, the curing agent and the prepolymer can be allowed to undergo at least one of elongation reaction and cross-linking reaction.

Reaction conditions (e.g., reaction time and a reaction temperature) for generating the prepolymer are not particularly limited and may be appropriately selected depending on the combination of the curing agent and the prepolymer. The reaction time is preferably from 10 minutes through 40 hours and more preferably from 2 hours through 24 hours. The reaction temperature is preferably from 0° C. through 150° C. and more preferably from 40° C. through 98° C.

A method for stably forming a dispersion liquid including the prepolymer in the aqueous medium is not particularly limited and may be appropriately selected depending on the intended purpose. Examples thereof include, but are not limited to, a method where the oil phase prepared by dissolving or dispersing the toner materials in the solvent is added to the aqueous medium phase, and the resultant mixture is dispersed by shear force.

A disperser used for the dispersing is not particularly limited and may be appropriately selected depending on the intended purpose. Examples thereof include, but are not limited to, a low-speed shearing disperser, a high-speed shearing disperser, a friction-type disperser, a high-pressure jet disperser, and an ultrasonic wave disperser. Of these, a high-speed shearing disperser is preferable because particle diameters of the dispersed components (oil droplets) can be controlled to be in the range of from 2 μm through 20 μm.

In the case where the high-speed shearing disperser is used, such conditions as rotational speed, dispersion time, and dispersion temperature are appropriately selected depending on the intended purpose. The rotational speed is preferably from 1,000 rpm through 30,000 rpm and more preferably from 5,000 rpm through 20,000 rpm. In the case of a batch system, the dispersion time is preferably from 0.1 minutes through 5 minutes. The dispersion temperature is preferably from 0° C. through 150° C. and more preferably from 40° C. through 98° C. under pressure. In general, it is easier to perform the dispersing at a higher dispersion temperature.

The amount of the aqueous medium used for emulsifying or dispersing the toner materials is not particularly limited and may be appropriately selected depending on the intended purpose. The amount thereof is preferably from 50 parts by mass through 2,000 parts by mass and more preferably from 100 parts by mass through 1,000 parts by mass, relative to 100 parts by mass of the toner materials. When the amount of the aqueous medium is less than 50 parts by mass, a dispersion state of the toner materials may be poor and toner base particles having predetermined particle diameters cannot be obtained in some cases. When the amount thereof is greater than 2,000 parts by mass, production cost may increase.

When the oil phase including the toner materials is emulsified or dispersed, a dispersant is preferably used in order to stabilize dispersed components (e.g., oil droplets), obtain desired shapes, and make a particle size distribution sharp.

The dispersant is not particularly limited and may be appropriately selected depending on the intended purpose. Examples thereof include, but are not limited to, a surfactant, a poorly water-soluble inorganic compound dispersant, and a polymer-based protective colloid. These may be used alone or in combination. Of these, a surfactant is preferable.

The surfactant is not particularly limited and may be appropriately selected depending on the intended purpose. Examples thereof include, but are not limited to, an anionic surfactant, a cationic surfactant, a nonionic surfactant, and an amphoteric surfactant. Examples of the anionic surfactant include, but are not limited to, alkyl benzene sulfonic acid salt, α-olefin sulfonic acid salt, and phosphoric acid ester. Of these, a surfactant including a fluoroalkyl group is preferable.

—Removal of Organic Solvent—

A method for removing the organic solvent from the dispersion liquid, such as the emulsified slurry, is not particularly limited and may be appropriately selected depending on the intended purpose. Examples thereof include, but are not limited to: a method where the entire reaction system is gradually heated to evaporate the organic solvent inside the oil droplets; and a method where a dispersion liquid is sprayed in a dry atmosphere to remove the organic solvent inside the oil droplets.

Once the organic solvent has been removed, composite particles are formed.

<Removing Step>

The removing step is a step of removing at least part of the resin particles from the composite particles. The removing step preferably removes part or all of the shell resin (the resin (b1)) of the resin particles.

Examples of the step of removing at least part of the resin particles include, but are not limited to, a step of washing the composite particles. The removing step may also be called a washing step.

Examples of the method for removing part or all of the resin (b1) in the washing step include, but are not limited to, a method where part or all of the resin (b1) is removed by a chemical method.

Examples of the chemical method include, but are not limited to, a method where the composite particles are washed with a basic aqueous solution. When the composite particles are washed with the basic aqueous solution, part or all of the shell resin (b1) can be dissolved.

As a result of the washing step, the above toner can be obtained.

The basic aqueous solution is not particularly limited and may be appropriately selected depending on the intended purpose, as long as the basic aqueous solution is basic. Examples of the basic aqueous solution include, but are not limited to, aqueous solutions of hydroxides of alkali metals (e.g., potassium hydroxide and sodium hydroxide) and ammonia. These may be used alone or in combination.

Of these, an aqueous solution of potassium hydroxide and an aqueous solution of sodium hydroxide are preferable because these aqueous solutions easily dissolve the shell resin (b1).

The pH of the basic aqueous solution is preferably from 8 through 14 and more preferably from 10 through 12.

Mixing of the composite particles and the basic aqueous solution in the washing step may be performed by dripping the basic aqueous solution into the composite slurry under stirring.

After completion of the dripping of the basic aqueous solution, an acid aqueous solution may be dripped for neutralization.

<Other Steps>

The other steps are not particularly limited and may be appropriately selected depending on the intended purpose. Examples thereof include, but are not limited to, a drying step and a classifying step.

The drying step is not particularly limited as long as the drying step can remove the solvent from the composite particles, and may be appropriately selected depending on the intended purpose.

The classifying step may be performed by removing minute particle components using a cyclone in the liquid, a decanter, or centrifugal separation. The classifying may be performed after the drying.

The obtained composite particles may be mixed with particles, such as the external additives and the charge controlling agent. During the mixing, a mechanical impact may be applied to prevent the particles, such as the external additives, from falling off from the surfaces of the toner base particles.

A method for applying the mechanical impact is not particularly limited and may be appropriately selected depending on the intended purpose. Examples thereof include, but are not limited to: a method where an impact is applied to the mixture using a blade rotating at high speed; and a method where the mixture is added to a high-speed gas flow to accelerate the movement of the mixture to crush the particles to each other or to an appropriate impact board.

A device used for the above method is not particularly limited and may be appropriately selected depending on the intended purpose. Examples thereof include, but are not limited to, ANGMILL (available from Hosokawa Micron Corporation), a device obtained by modifying an I-type mill (available from Nippon Pneumatic Mfg. Co., Ltd.) to reduce pulverizing air pressure, a hybridization system (available from Nara Machinery Co., Ltd.), a kryptron system (available from Kawasaki Heavy Industries, Ltd.), and an automatic mortar.

(Toner Stored Unit)

The toner stored unit in the present disclosure is a container having the function of storing a toner, where the toner is stored in the unit. Examples of an embodiment of the toner stored unit include, but are not limited to, a toner stored container, a developing device, and a process cartridge.

The toner stored container is a container storing a toner therein.

The developing device is a device that stores a toner therein and is configured to develop an image using the toner.

The process cartridge includes at least an image bearer and the developing unit that are integrated. The process cartridge stores a toner therein and is mounted detachably to an image forming apparatus. The process cartridge may further include at least one selected from the group consisting of a charging unit, an exposing unit, and a cleaning unit.

Figure 2:
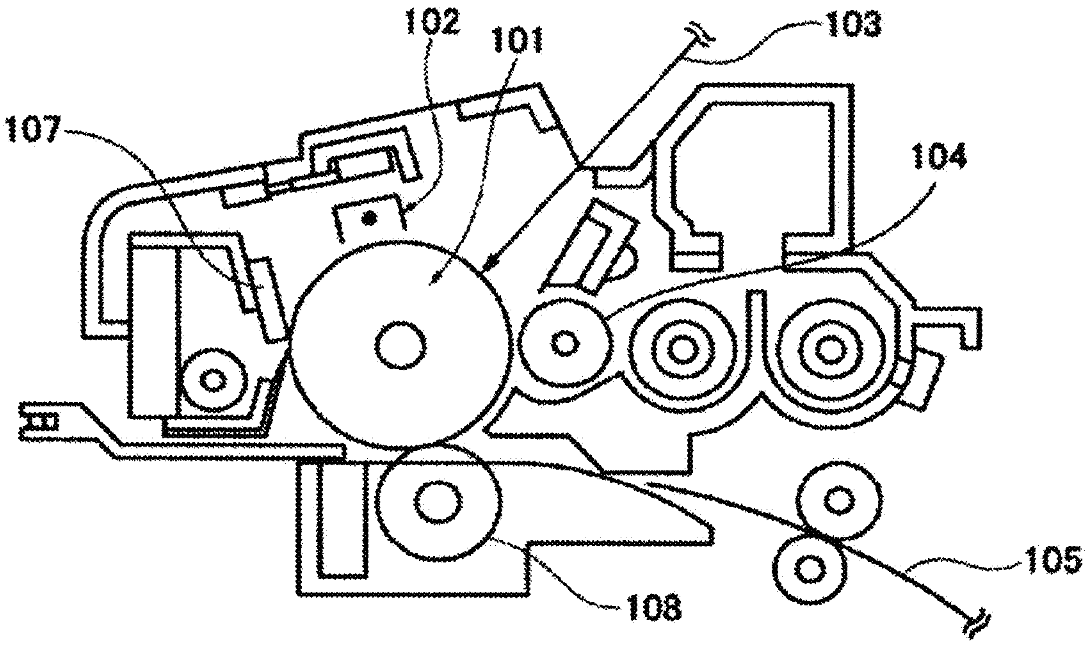
FIG. 2 is a schematic view illustrating one example of a process cartridge of the present disclosure.

An embodiment of the process cartridge is illustrated in FIG. 2. The process cartridge of the present embodiment includes, as illustrated in FIG. 2, a latent image bearer 101 inside the process cartridge, a charging device 102, a developing device 104, and a cleaning unit 107, and may further include other units according to the necessity.

As the latent image bearer 101, a latent image bearer similar to an electrostatic latent image bearer used in the below-described image forming apparatus can be used. Any charging member may be used for the charging device 102.

According to an image formation process performed by the process cartridge illustrated in FIG. 2, the latent image bearer 101 is charged by the charging device 102, and exposed to light 103 from an exposing unit, while being rotated in the direction indicated by the arrow, to thereby form an electrostatic latent image corresponding to the exposure image on the surface of the latent image bearer.

The electrostatic latent image is developed with a toner by the developing device 104. The developed toner image is transferred onto recording paper 105 by a transfer roller 108 and is printed out. Subsequently, the surface of the latent image bearer after the image transfer is cleaned by the cleaning unit 107, and the residual charge is eliminated by a charge eliminating unit. The above-described series of processes is repeated.

(Image Forming Apparatus and Image Forming Method)

The image forming apparatus of the present disclosure includes the above toner stored unit, and includes at least an electrostatic latent image bearer, an electrostatic latent image forming unit, and a developing unit. Preferably, the image forming apparatus may further include other units according to the necessity.

The image forming method of the present disclosure includes at least an electrostatic latent image forming step and a developing step, and may further include other steps according to the necessity.

<Electrostatic Latent Image Bearer>

A material, structure, and size of the electrostatic latent image bearer are not particularly limited and may be appropriately selected from those known in the art. Examples of the material thereof include, but are not limited to: inorganic photoconductors, such as amorphous silicon and selenium; and organic photoconductors, such as polysilane and phthalopolymethine. Of these, amorphous silicon is preferable in view of a long service life.

The linear speed of the electrostatic latent image bearer is preferably 300 mm/s or greater.

<Electrostatic Latent Image Forming Unit and Electrostatic Latent Image Forming Step>

The electrostatic latent image forming unit is not particularly limited as long as the electrostatic latent image forming unit is a unit configured to form an electrostatic latent image on the electrostatic latent image bearer, and may be appropriately selected depending on the intended purpose. Examples of the electrostatic latent image forming unit include, but are not limited to, a unit including at least a charging member configured to charge a surface of the electrostatic latent image bearer and an exposing unit configured to expose the surface of the electrostatic latent image bearer to light imagewise.

The electrostatic latent image forming step is not particularly limited as long as the electrostatic latent image forming step is a step of forming an electrostatic latent image on the electrostatic latent image bearer, and may be appropriately selected depending on the intended purpose. The electrostatic latent image forming step is performed by, for example, charging the surface of the electrostatic latent image bearer, followed by exposing to light imagewise. The electrostatic latent image forming step can be performed using the electrostatic latent image forming unit.

—Charging Member and Charging—

The charging member is not particularly limited and may be appropriately selected depending on the intended purpose. Examples of the charging member include, but are not limited to: contact chargers know per se, each equipped with a conductive or semiconductive roller, brush, film, or rubber blade; and non-contact chargers utilizing corona discharge, such as corotron and scorotron.

The charging can be performed by, for example, applying voltage to the surface of the electrostatic latent image bearer using the charging member.

The shape of the charging member may be appropriately selected depending on specifications or forms of the image forming apparatus. The charging member may be in any form, such as a magnetic brush and a fur brush, in addition to a roller.

The charging member is not limited to the contact charging member, but use of the contact charging member is preferable. This is because an image forming device that can be obtained has a reduced amount of ozone generated from the charging member.

<<Exposing Unit and Exposing>>

The exposing unit is not particularly limited as long as the exposing unit is a unit configured to expose the surface of the electrostatic latent image bearer charged by the charging member to light imagewise, and may be appropriately selected depending on the intended purpose. Examples thereof include, but are not limited to, various exposing units, such as a copy optical system, a rod lens array system, a laser optical system, and a liquid crystal shutter optical system.

A light source used in the exposing unit is not particularly limited and may be appropriately selected depending on the intended purpose. Examples thereof include, but are not limited to, general emitters, such as fluorescent lamps, tungsten lamps, halogen lamps, mercury lamps, sodium lamps, light-emitting diodes (LEDs), laser diodes (LDs), and electroluminescence (EL).

Various filters may be used for emitting light having only a desired wavelength range. Examples of the filters include, but are not limited to, sharp-cut filters, band-pass filters, near-infrared-cut filters, dichroic filters, interference filters, and color temperature conversion filters.

The exposing can be performed by, for example, exposing the surface of the electrostatic latent image bearer imagewise using the exposing unit.

In the present disclosure, a back light system may be employed. The back light system is a system where the back surface of the electrostatic latent image bearer is exposed to light imagewise.

<Developing Unit and Developing Step>

The developing unit is not particularly limited as long as the developing unit including a toner and is a unit configured to develop the electrostatic latent image formed on the electrostatic latent image bearer with the toner to form a toner image that is a visible image. The developing unit may be appropriately selected depending on the intended purpose.

The developing step is not particularly limited as long as the developing step is a step of developing the electrostatic latent image formed on the electrostatic latent image bearer with a toner to form a toner image that is a visible image. The developing step may be appropriately selected depending on the intended purpose.

The developing unit is preferably a developing device including a stirrer configured to stir the toner to cause friction and charge the toner, a rotatable developer bearer configured to carry a developer including the toner on a surface thereof, and a magnetic field generating unit fixed inside the developer bearer.

<Other Units and Other Steps>

Examples of the above other units include, but are not limited to, a transferring unit, a fixing unit, a cleaning unit, a charge eliminating unit, a recycling unit, and a controlling unit.

Examples of the above other steps include, but are not limited to, a transferring step, a fixing step, a cleaning step, a charge eliminating step, a recycling step, and a controlling step.

—Transferring Unit and Transferring Step—

The transferring unit is not particularly limited as long as the transferring unit is a unit configured to transfer the visible image onto a recording medium, and may be appropriately selected depending on the intended purpose. A preferable embodiment of the transferring unit includes a primary transferring unit configured to transfer visible images onto an intermediate transfer member to form a composite transfer image, and a secondary transferring unit configured to transfer the composite transfer image onto a recording medium.

The transferring step is not particularly limited as long as the transferring step is a step of transferring the visible image onto a recording medium, and may be appropriately selected depending on the intended purpose. A preferable embodiment of the transferring step uses an intermediate transfer member and includes primarily transferring the visible image onto the intermediate transfer member and then secondarily transferring the visible image onto the recording medium.

The transferring step can be performed by, for example, charging the photoconductor using a transfer charger. The transferring step can be performed by the transferring unit.

In the case where an image that is secondarily transferred onto the recording medium is a color image formed of toners of two or more colors, toners of different colors are sequentially superimposed on the intermediate transfer member by the transferring unit to form an image on the intermediate transfer member, and the image on the intermediate transfer member is collectively transferred onto the recording medium by an intermediate transferring unit.

The intermediate transfer member is not particularly limited and may be appropriately selected from transfer members known in the art. Preferable examples thereof include, but are not limited to, a transfer belt.

The transferring unit (the primary transferring unit or the secondary transferring unit) preferably includes at least a transfer member configured to charge and separate the visible image on the photoconductor towards the recording medium. Examples of the transfer member include, but are not limited to, a corona transfer charger using corona discharge, a transfer belt, a transfer roller, a pressure transfer roller, and an adhesion transfer member.

Although the recording medium is typically plain paper, the recording medium is not particularly limited as long as the recording medium can receive a transferred unfixed image after developing, and may be appropriately selected depending on the intended purpose. For example, a PET base for OHP can be used as the recording medium.

—Fixing Unit and Fixing Step—

The fixing unit is not particularly limited as long as the fixing unit is a unit configured to fix the transferred image on the recording medium, and may be appropriately selected depending on the intended purpose. For example, the fixing unit is preferably a heat-pressure member known in the art. Examples of the heat-pressure member include, but are not limited to, a combination of a heat roller and a press roller, and a combination of a heat roller, a press roller, and an endless belt.

The fixing step is not particularly limited as long as the fixing step is a step of fixing the transferred visible image on the recording medium, and may be appropriately selected depending on the intended purpose. For example, the fixing step may be performed every time a toner of each color is transferred onto the recording medium. Alternatively, the fixing step may be performed on a laminate of toners of different colors at once.

The fixing step can be performed by the fixing unit.

The heating by the heat-press member is preferably performed at a temperature of from 80° C. through 200° C.

In the present disclosure, for example, an optical fixing unit known in the art may be used instead of or in combination with the fixing unit depending on the intended purpose.

The surface pressure applied during the fixing step is not particularly limited and may be appropriately selected depending on the intended purpose. The surface pressure is preferably from 10 $N/cm^2$ through 80 $N/cm^2$.

<<Cleaning Unit and Cleaning Step>>

The cleaning unit is not particularly limited as long as the cleaning unit is a unit configured to remove the residual toner on the photoconductor, and may be appropriately selected depending on the intended purpose. Examples of the cleaning unit include, but are not limited to, a magnetic brush cleaner, an electrostatic brush cleaner, a magnetic roller cleaner, a blade cleaner, a brush cleaner, and a web cleaner.

The cleaning step is not particularly limited as long as the cleaning step is a step of removing the residual toner on the photoconductor, and may be appropriately selected depending on the intended purpose. For example, the cleaning step can be performed by the cleaning unit.

—Charge Eliminating Unit and Charge Eliminating Step—

The charge eliminating unit is not particularly limited as long as the charge eliminating unit is a unit configured to apply a charge eliminating bias to a photoconductor to eliminate the charges of the photoconductor, and may be appropriately selected depending on the intended purpose. Examples of the charge eliminating unit include, but are not limited to, a charge eliminating lamp.

The charge eliminating step is not particularly limited as long as the charge eliminating step is a step of applying a charge eliminating bias to a photoconductor to eliminate the charges of the photoconductor, and may be appropriately selected depending on the intended purpose. For example, the charge eliminating step can be performed by the charge eliminating unit.

—Recycling Unit and Recycling Step—

The recycling unit is not particularly limited as long as the recycling unit is a unit configured to recycle the toner removed in the cleaning step to the developing device, and may be appropriately selected depending on the intended purpose. Examples of the recycling unit include, but are not limited to, conveying members known in the art.

The recycling step is not particularly limited as long as the recycling step is a step of recycling the toner removed in the cleaning step to the developing device, and may be appropriately selected depending on the intended purpose. For example, the recycling step can be performed by the recycling unit.

Next, one embodiment for carrying out the method for forming an image by the image forming apparatus of the present disclosure will be described with reference to FIG. 3. As the image forming apparatus of the present embodiment, a printer is depicted as an example. However, the image forming apparatus of the present disclosure is not limited, as long as the image forming apparatus is an apparatus capable of forming an image using the toner, such as photocopiers, facsimiles, and multifunction peripherals.

The image forming apparatus includes a paper feeding unit 210, a conveying unit 220, an image forming unit 230, a transferring unit 240, and a fixing unit 250.

The paper feeding unit 210 includes a paper feeding cassette 211 in which sheets of paper P to be fed are stacked, and a paper feeding roller 212 configured to feed, one by one, the sheets of the paper P stacked in the paper feeding cassette 211.

The conveying unit 220 includes rollers 221 configured to feed the paper P fed by the paper feeding roller 212 to the direction towards the transfer unit 240, a pair of timing rollers 222 configured to idle while nipping the edge of the paper P fed by the rollers 221 and send the paper P to the transferring unit 240 at a predetermined timing, and paper ejection rollers 223 configured to eject the paper on which a toner image has been fixed to a paper ejection tray 224.

Figure 3:
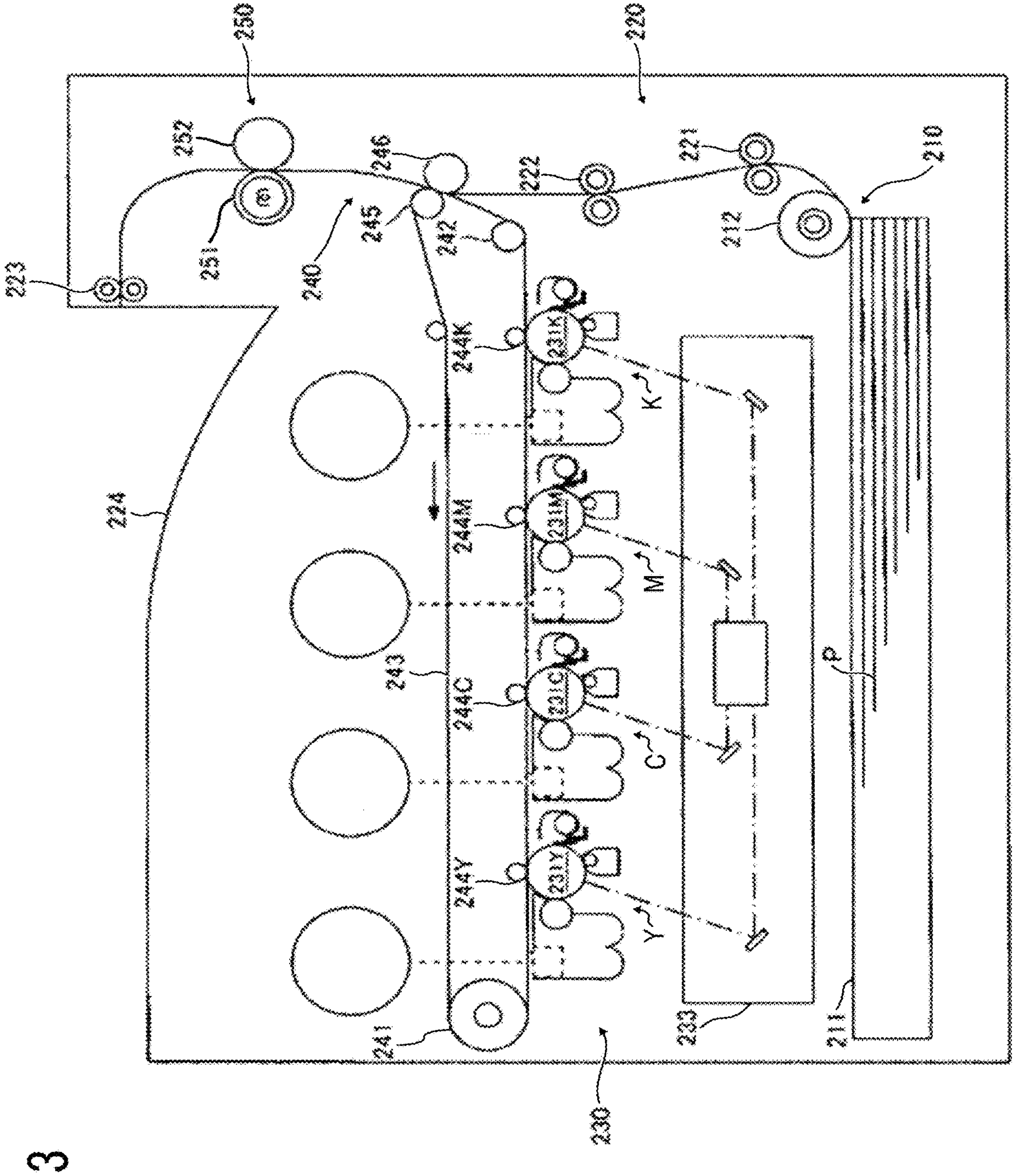
FIG. 3 is a schematic view illustrating one example of an image forming apparatus of the present disclosure.

The image forming unit 230 includes, along the direction from the left to the right in FIG. 3, an image forming unit Y configured to form an image using a developer including a yellow toner, an image forming unit C configured to form an image using a developer including a cyan toner, an image forming unit M configured to form an image using a developer including a magenta toner, an image forming unit K configured to form an image using a developer including a black toner, and an exposing unit 233, where all of the above units are disposed in a manner that a predetermined gap is between the units next to each other.

In the case where any of the image forming units (Y, C, M, and K) is mentioned, it is referred to as an image forming unit.

The developer includes the toner and a carrier. The four image forming units (Y, C, M, and K) have substantially the same mechanical structure, except that the developer for use is different.

The transferring unit 240 includes: a driving roller 241 and a driven roller 242; an intermediate transfer belt 243 capable of rotating counterclockwise in FIG. 3 along with the rotation of the driving roller 241; primary transfer rollers 244Y, 244C, 244M, and 244K disposed to face the photoconductor drum 231Y, 231C, 231M, and 231K, respectively, via the intermediate transfer belt 243; and a secondary counter roller 245 and a secondary transfer roller 246 disposed to face each other via the intermediate transfer belt 243 in the transfer position of a toner image onto paper.

The fixing unit 250 includes a fixing belt 251 and a press roller 252. The fixing belt 251 includes a heater therein to heat paper P. The press roller 252 is configured to rotatably press the fixing belt 251 to form a nip. With this configuration, heat and pressure are applied to the color toner image on the paper P to fix the color toner image. The paper P on which the color toner image has been fixed is ejected to the paper ejection tray 224 by the paper ejection rollers 223. In this manner, a series of the image formation processes is completed.

EXAMPLES

The present disclosure will be described below by way of Examples. The present disclosure should not be construed as being limited to these Examples.

Production Example 1

[Production of Aqueous Dispersion Liquid (W0-1) of Resin Particles (A)]

A reaction vessel equipped with a stirrer, a heating and cooling device, and a thermometer was charged with 3,710 parts by mass of water and 200 parts by mass of polyoxyethylene-1-(allyloxymethyl)alkyl ether ammonium sulfate (AQUALON KH-1025, obtained from DKS Co., Ltd.). The resultant mixture was homogeneously stirred at 200 rpm. The homogenized mixture was heated to increase the system temperature to 75° C., and then 90 parts by mass of a 10% by mass ammonium persulfate aqueous solution was added. To the resultant, a mixed solution including 450 parts by mass of styrene, 250 parts by mass of butyl acrylate, and 300 parts by mass of methacrylic acid was dripped for 4 hours.

After completion of the dripping, the resultant was aged at 75° C. for 4 hours, to obtain a resin particle dispersion liquid (W0-1) including a resin (a1-1), which was a polymer obtained by copolymerizing the monomers and the polyoxyethylene-1-(allyloxymethyl)alkyl ether ammonium sulfate.

The volume average particle diameter of the particles in the particle dispersion liquid (W0-1) was measured by a dynamic light scattering method (light-scattering electrophoresis device ELS-8000, obtained from OTSUKA ELECTRONICS, CO., LTD.). The result was 15 nm.

A portion of the particle dispersion liquid (W0-1) was dried to separate the resin (a1-1). The resin component had a glass transition temperature (Tg) of 53° C. and an acid value of 195 mgKOH/g.

The present disclosure can be achieved by using the resin particles A and the resin particles B in combination. Since the resin particles B could be produced by the same production method as for the resin a1-1, the resin a1-1 was also used as the resin particles B-1.

Production Example 2

[Production of Aqueous Dispersion Liquid (W0-2) of Resin Particles (A)]

A reaction vessel equipped with a stirrer, a heating and cooling device, and a thermometer was charged with 3,760 parts by mass of water and 150 parts by mass of polyoxyethylene-1-(allyloxymethyl)alkyl ether ammonium sulfate (AQUALON KH-1025, obtained from DKS Co., Ltd.). The resultant mixture was homogeneously stirred at 200 rpm. The homogenized mixture was heated to increase the system temperature to 75° C., and then 90 parts by mass of a 10% by mass ammonium persulfate aqueous solution was added. To the resultant, a mixed solution including 430 parts by mass of styrene, 270 parts by mass of butyl acrylate, and 300 parts by mass of methacrylic acid was dripped for 4 hours.

After completion of the dripping, the resultant was aged at 75° C. for 4 hours, to obtain a resin particle dispersion liquid (W0-2) including a resin (a2-1), which was a polymer obtained by copolymerizing the monomers and the polyoxyethylene-1-(allyloxymethyl)alkyl ether ammonium sulfate.

The volume average particle diameter of the particles in the particle dispersion liquid (W0-2) was measured in the same manner as in Production Example 1. The result was 30 nm.

A portion of the particle dispersion liquid (W0-2) was dried to separate the resin (a2-1). The resin component had a glass transition temperature (Tg) of 53° C. and an acid value of 195 mgKOH/g.

The present disclosure can be achieved by using the resin particles A and the resin particles B in combination. Similar to Production Example 1, since the resin particles B could be produced by the same production method as for the resin a2-1, the resin a2-1 was also used as the resin particles B-2.

Production Example 3

[Production of Aqueous Dispersion Liquid (W0-3) of Resin Particles (A)]

A reaction vessel equipped with a stirrer, a heating and cooling device, and a thermometer was charged with 3,810 parts by mass of water and 100 parts by mass of polyoxyethylene-1-(allyloxymethyl)alkyl ether ammonium sulfate (AQUALON KH-1025, obtained from DKS Co., Ltd.). The resultant mixture was homogeneously stirred at 200 rpm. The homogenized mixture was heated to increase the system temperature to 75° C., and then 90 parts by mass of a 10% by mass ammonium persulfate aqueous solution was added. To the resultant, a mixed solution including 400 parts by mass of styrene, 300 parts by mass of butyl acrylate, and 300 parts by mass of methacrylic acid was dripped for 4 hours.

After completion of the dripping, the resultant was aged at 75° C. for 4 hours, to obtain a resin particle dispersion liquid (W0-3) including a resin (a3-1), which was a polymer obtained by copolymerizing the monomers and the poly-oxyethylene-1-(allyloxymethyl)alkyl ether ammonium sulfate.

The volume average particle diameter of the particles in the particle dispersion liquid (W0-3) was measured in the same manner as in Production Example 1. The result was 45 nm.

A portion of the particle dispersion liquid (W0-3) was dried to separate the resin (a3-1). The resin component had a glass transition temperature (Tg) of 53° C. and an acid value of 195 mgKOH/g.

The present disclosure can be achieved by using the resin particles A and the resin particles B in combination. Similar to Production Example 1, since the resin particles B could be produced by the same production method as for the resin a3-1, the resin a3-1 was also used as the resin particles B-3.

Details of the aqueous dispersion liquids (W0-1) to (W0-3) of the resin particles (A) are summarized in Table 1.

TABLE 1

| | Aqueous dispersion liquid of resin particles (A) | | |
|---|---|---|---|
| Components (parts by mass) | W0-1 | W0-2 | W0-3 |
| Water | 3,710 | 3,760 | 3,810 |
| Polyoxyethylene-1-(allyloxymethyl) alkyl ether ammonium sulfate | 200 | 150 | 100 |
| 10% by mass ammonium persulfate aqueous solution | 90 | 90 | 90 |
| Styrene | 450 | 430 | 400 |
| Butyl acrylate | 250 | 270 | 300 |
| Methacrylic acid | 300 | 300 | 300 |
| Volume average particle diameter (nm) | 15 | 30 | 45 |
| Glass transition temperature (° C.) | 53 | 53 | 53 |
| Acid value (mgKOH/g) | 195 | 195 | 195 |

Production Example 4

<Production of Aqueous Dispersion Liquid (W-1) of Resin Particles (A-1)>

Next, a reaction vessel equipped with a stirrer, a heating and cooling device, and a thermometer was charged with 667 parts by mass of the aqueous dispersion liquid (W0-1) of the resin particles (A) and 248 parts by mass of water. To the resultant, 0.267 parts by mass of tert-butyl hydroperoxide (PERBUTYL H, obtained from NOF CORPORATION). The resultant mixture was heated to increase the system temperature to 70° C., and then a mixed solution including 43.3 parts by mass of styrene, 23.3 parts by mass of butyl acrylate, and 18.0 parts by mass of a 1% by mass ascorbic acid aqueous solution was dripped for 2 hours.

After completion of the dripping, the resultant was aged at 70° C. for 4 hours, to obtain an aqueous dispersion liquid (W-1) of resin particles (A-1) including the resin (a1-1) and resin (a2-1) in each particle. The resin (a2-1) was a polymer obtained by copolymerizing the monomers using the resin particles in the aqueous dispersion liquid (W0-1) as seeds.

The volume average particle diameter of the resin particles (A-1) was measured in the same manner as in Production Example 1. The result was 17.3 nm.

The aqueous dispersion liquid (W-1) of the resin particles (A-1) was neutralized with a 10% by mass ammonia aqueous solution to have a pH of 9.0. The sediments obtained by centrifugal separation were dried and solidified to separate the resin (a2-1). A glass transition temperature (Tg) of the resin (a2-1) was 53° C.

It was confirmed in the following manner that the aqueous dispersion liquid (W-1) of the resin particles (A-1) contained the resin particles (A-1) each including the resin (a1-1) and the resin (a2-1) in the same particle as constitutional components.

Specifically, 2 parts by mass of gelatin (Cook Gelatin, obtained from MORINAGA & CO., LTD.) was added to and dissolved in 15 parts by mass of water heated to a temperature of from 95° C. through 100° C. The gelatin aqueous solution, which had been air-cooled to be 40° C., and the aqueous dispersion liquid (W-1) of the resin particles (A-1) were blended at a mass ratio of 1:1. After thoroughly stirring the resultant mixture, the mixture was cooled at 10° C. for 1 hour to produce a hardened gel.

The produced gel was cut into a section having a thickness of 80 nm by an ultramicrotome (Ultramicrotome UC7, FC7, obtained from Leica Microsystems) while controlling the temperature to −80° C. The produced section was dyed in a vapor phase with a 2% by mass ruthenium tetroxide aqueous solution for 5 minutes. The dyed section was observed under a transmission electron microscope (H-7100, obtained from Hitachi High-Tech Corporation) for confirmation.

Production Example 5

<Production of Aqueous Dispersion Liquid (W-2) of Resin Particles (A-2)>

Next, a reaction vessel equipped with a stirrer, a heating and cooling device, and a thermometer was charged with 667 parts by mass of the aqueous dispersion liquid (W0-2) of the resin particles (A) and 248 parts by water. To the resultant, 0.267 parts by mass of tert-butyl hydroperoxide (PERBUTYL H, obtained from NOF CORPORATION). The resultant mixture was heated to increase the system temperature to 70° C., and then a mixed solution including 43.3 parts by mass of styrene, 23.3 parts by mass of butyl acrylate, and 18.0 parts by mass of a 1% by mass ascorbic acid aqueous solution was dripped for 2 hours.

After completion of the dripping, the resultant was aged at 70° C. for 4 hours, to obtain an aqueous dispersion liquid (W-2) of resin particles (A-2) including the resin (a1-2) and resin (a2-2) in each particle. The resin particles (a2-2) was a polymer obtained by copolymerizing the monomers using the resin particles in the aqueous dispersion liquid (W0-2) as seeds.

The volume average particle diameter of the resin particles (A-2) was measured in the same manner as in Production Example 1. The result was 34.3 nm.

The aqueous dispersion liquid (W-2) of the resin particles (A-2) was neutralized with a 10% by mass ammonia aqueous solution to have a pH of 9.0. The sediments obtained by centrifugal separation were dried and solidified to separate the resin (a2-2). A glass transition temperature (Tg) of the resin (a2-2) was 53° C.

It was confirmed in the same manner as in Production Example 4 that the aqueous dispersion liquid (W-2) of the resin particles (A-2) contained the resin particles (A-2) each including the resin (a1-2) and the resin (a2-2) in the same particle as constitutional components.

Production Example 6

<Production of Aqueous Dispersion Liquid (W-3) of Resin Particles (A-3)>

Next, a reaction vessel equipped with a stirrer, a heating and cooling device, and a thermometer was charged with 667 parts by mass of the aqueous dispersion liquid (W0-3) of the resin particles (A) and 248 parts by water. To the resultant, 0.267 parts by mass of tert-butyl hydroperoxide (PERBUTYL H, obtained from NOF CORPORATION). The resultant mixture was heated to increase the system temperature to 70° C., and then a mixed solution including 43.3 parts by mass of styrene, 23.3 parts by mass of butyl acrylate, and 18.0 parts by mass of a 1% by mass ascorbic acid aqueous solution was dripped for 2 hours.

After completion of the dripping, the resultant was aged at 70° C. for 4 hours, to obtain an aqueous dispersion liquid (W-3) of resin particles (A-3) including the resin (a1-3) and resin (a2-3) in each particle. The resin (a2-3) was a polymer obtained by copolymerizing the monomers using the resin particles in the aqueous dispersion liquid (W0-3) as seeds.

The volume average particle diameter of the resin particles (A-3) was measured in the same manner as in Production Example 1. The result was 51.5 nm.

The aqueous dispersion liquid (W-3) of the resin particles (A-3) was neutralized with a 10% by mass ammonia aqueous solution to have a pH of 9.0. The sediments obtained by centrifugal separation were dried and solidified to separate the resin (a2-3). A glass transition temperature (Tg) of the resin (a2-3) was 53° C.

It was confirmed in the same manner as in Production Example 4 that the aqueous dispersion liquid (W-3) of the resin particles (A-3) contained the resin particles (A-3) each including the resin (a1-3) and the resin (a2-3) in the same particle as constitutional components.

Details of the resin particles (A-1) to (A-3) are summarized in Table 2.

Subsequently, the resultant was cooled to 180° C. To the resultant, 30 parts by mass of trimellitic anhydride was added. The mixture was allowed to react at 180° C. for 1 hour, followed by taking out the resin.

After cooling the resin taken out, amorphous polyester (b-1) was obtained. The resin component had a glass transition temperature (Tg) of 42° C., a number average molecular weight (Mn) of 2,400, a weight average molecular weight (Mw) of 5,400, a hydroxyl value of 32 mgKOH/g, and an acid value of 18 mgKOH/g.

Production Example 8

<Production of Colorant Dispersion Liquid>

A reaction vessel equipped with a cooling tube, a stirrer, a heating and cooling device, a thermometer, and a nitrogen inlet tube was charged with 557 parts by mass of propylene glycol, 569 parts by mass of dimethyl terephthalate, 184 parts by mass of adipic acid, and 3 parts by mass of tetrabutoxy titanate serving as a condensation catalyst. The mixture was allowed to react at 180° C. for 8 hours under a nitrogen flow while removing generated methanol.

Subsequently, the resultant was gradually heated to 230° C., and was allowed to react for 4 hours under a nitrogen flow while removing generated propylene glycol and water. The reaction mixture was allowed to further react for 1 hour under a reduced pressure of from 0.007 MPa through 0.026 MPa.

The amount of the recovered propylene glycol was 175 parts by mass.

Subsequently, the resultant was cooled to 180° C. To the resultant, 121 parts by mass of trimellitic anhydride was added. The resultant mixture was allowed to react for 2

TABLE 2

| Resin Particle No. | Type of particle dispersion liquid | Particle dispersion liquid (parts by mass) | Water (parts by mass) | tert-Butyl hydro-peroxide (parts by mass) | Styrene (parts by mass) | Butyl acrylate (parts by mass) | 1% by mass ascorbic acid aqueous liquid (parts by mass) | Volume average particle diameter (nm) | Tg (° C.) |
|---|---|---|---|---|---|---|---|---|---|
| A-1 | WO-1 | 667 | 248 | 0.267 | 43.3 | 23.3 | 18.0 | 17.3 | 53 |
| A-2 | WO-2 | 667 | 248 | 0.267 | 43.3 | 23.3 | 18.0 | 34.3 | 53 |
| A-3 | WO-3 | 667 | 248 | 0.267 | 43.3 | 23.3 | 18.0 | 51.5 | 53 |

Production Example 7

<Synthesis of Amorphous Polyester Resin (b-1)>

A reaction vessel equipped with a cooling tube, a stirrer, a heating and cooling device, a thermometer, and a nitrogen inlet tube was charged with 425 parts by mass of a bisphenol A-PO (2 mol) adduct, 100 parts by mass of propylene glycol, 634 parts by mass of a terephthalic acid-propylene glycol (2 mol) adduct, and 0.5 parts by mass of titanium diisopropoxy bistriethanol aminate serving as a condensation catalyst. The mixture was allowed to react at 230° C. for 12 hours.

Subsequently, the resultant was allowed to react under a reduced pressure of from 10 mmHg through 15 mmHg.

The amount of the recovered propylene glycol was 195 parts by mass.

hours in a sealed state under the atmospheric pressure. The reaction mixture was heated to 220° C. under the atmospheric pressure and was allowed to react until a softening point reached 180° C., to obtain a polyester resin (number average molecular weight (Mn)=8,500).

A beaker was charged with 20 parts by mass of copper phthalocyanine, 4 parts by mass of a colorant dispersant (Solsperse 28000, obtained from The Lubrizol Corporation), 20 parts by mass of the obtained polyester resin, and 56 parts by mass of ethyl acetate. The mixture was homogeneously dispersed with stirring. The copper phthalocyanine was minutely dispersed therein by a bead mill, to obtain [colorant dispersion liquid].

The volume average particle diameter of the particles in the [colorant dispersion liquid] was 0.2 μm.

Production Example 9

<Production of Modified Wax (d)>

A pressure-resistant reaction vessel equipped with a stirrer, a heating and cooling device, a thermometer, and a dripping cylinder was charged with 454 parts by mass of xylene and 150 parts by mass of low-molecular-weight polyethylene (Sanwax LEL-400, obtained from Sanyo Chemical Industries, Ltd.). After purging with nitrogen, the mixture was heated to 170° C. under stirring. A mixed solution including 595 parts by mass of styrene, 255 parts by mass of methyl methacrylate, 34 parts by mass of di-t-butylperoxyhexahydroterephthalate, and 119 parts by mass of xylene was dripped for 3 hours at the same temperature. The resultant mixture was kept at the same temperature for 30 minutes.

Subsequently, the xylene was removed under a reduced pressure of 0.039 MPa to obtain modified wax (d). The sp value of the graft chain of the modified wax (d) was 10.35 $(cal/cm^3)^{1/2}$, and the modified wax (d) had a number average molecular weight (Mn) of 1,900, a weight average molecular weight (Mw) of 5,200, and a glass transition temperature (Tg) of 57° C.

Production Example 10

<Production of Release Agent Dispersion Liquid>

A reaction vessel equipped with a cooling tube, a stirrer, a heating and cooling device, and a thermometer was charged with 10 parts by mass of paraffin wax (HNP-9, obtained from NIPPON SEIRO CO., LTD.), 1 part by mass of the modified wax (d), and 33 parts by mass of ethyl acetate. The mixture was heated to 78° C. and was stirred for 30 minutes at the same temperature. The resultant mixture was cooled to 30° C. for 1 hour to precipitate the paraffin wax as particles. The resultant was subjected to wet pulverization by means of ULTRA VISCOMILL (obtained from AMEX CO., LTD.) to obtain [release agent dispersion liquid].

The volume average particle diameter of the [release agent dispersion liquid] was 0.25 μm.

Production Example 11

<Production of Reactive Prepolymer (α2b-1)>

A reaction vessel equipped with a cooling tube, a stirrer, a heating and cooling device, a thermometer, and a nitrogen inlet tube was charged with 439 parts by mass of a bisphenol A-PO (2 mol) adduct, 329 parts by mass of a bisphenol A-PO (3 mol) adduct, 206 parts by mass of terephthalic acid, 90 parts by mass of adipic acid, and 0.5 parts by mass of titanium diisopropoxy bistriethanol aminate serving as a condensation catalyst. The mixture was gradually heated to 230° C. and was allowed to react for 10 hours under a reduced pressure of from 0.5 kPa through 2.5 kPa.

The reaction product was taken out when the acid value reached a value less than 1 mgKOH/g, to thereby obtain polyester (α2b0-1). The resin component had a glass transition temperature (Tg) of 45° C., a number average molecular weight (Mn) of 3,900, a weight average molecular weight (Mw) of 11,000, and a hydroxyl value of 25 mgKOH/g.

Next, a pressure-resistant reaction vessel equipped with a stirrer, a heating and cooling device, and a thermometer was charged with 448 parts by mass of the polyester (α2b0-1), 52 parts by mass of isophorone diisocyanate, and 500 parts by mass of ethyl acetate. The mixture was allowed to react at 80° C. for 10 hours in a sealed state, to obtain a solution of a reactive prepolymer (α2b-1) including an isocyanate group at the terminal of a molecular structure thereof.

The reactive prepolymer (α2b-1) had a urethane group concentration of 2.0, a number average molecular weight (Mn) of 6,900, and a weight average molecular weight (Mw) of 25,000.

Example 1

<Production of Composite Resin Particles (C-1)>

A beaker was charged with 165 parts by mass of ion-exchanged water, a mixture of 5 parts by mass of the particle dispersion liquid (W-1) and 10 parts by mass of the particle dispersion liquid (W0-1), 1 part by mass of sodium carboxymethyl cellulose, 26 parts by mass of sodium dodecyl diphenyl ether disulfonate (ELEMINOL MON-7, obtained from Sanyo Chemical Industries, Ltd.), and 15 parts by mass of ethyl acetate. The mixture was mixed to obtain a dispersion liquid.

Separately, a beaker was charged with 71 parts by mass of the amorphous polyester resin (b-1), 40 parts by mass of the [colorant dispersion liquid], 39 parts by mass of the [release agent dispersion liquid], and 54 parts by mass of ethyl acetate. The mixture was mixed together. To the mixture, 18 parts by mass of the reactive prepolymer (α2b-1) solution and 0.3 parts by mass of isophorone diamine as a curing agent (β) were added. The resultant was mixed to obtain a mixed solution.

The total amount of the obtained mixed solution was added to the previously produced dispersion liquid. The resultant mixture was stirred for 2 minutes by means of T.K. AUTOHOMOMIXER, to obtain a mixed solution.

The obtained mixed solution was transferred into a reaction vessel equipped with a stirrer and a thermometer. Until the concentration of the ethyl acetate reached 0.5% by mass or less at 50° C., the ethyl acetate was removed from the mixed solution to form composite resin particles to obtain an aqueous dispersion liquid of the composite resin particles.

The aqueous dispersion liquid of the composite resin particles included composite resin particles where the particles including the resin particles (A-1) were deposited on resin particles (B'-1) each including the amorphous polyester resin (b-1) and an amorphous polyurethane resin (b-2) formed of a reaction product between the reactive prepolymer (α2b-1) and the isophorone diamine.

Whether the resin particles included in the aqueous dispersion liquid of the composite resin particles were composite resin particles (C-1) where the particles including the particles (A-1) were deposited on the resin particles (B'-1) was confirmed through magnified observation of shapes of the particles in the aqueous dispersion liquid of the composite resin particles under an electron microscope (scanning electron microscope SU-8230, obtained from Hitachi High-Tech Corporation).

Next, sodium hydroxide was added to the aqueous dispersion liquid of the composite resin particles to adjust the pH thereof to 12. The mixture was stirred for 1 hour by means of Three-One Motor. The resultant was subjected to centrifugal filtration. Ion-exchanged water was added to the filtration cake for re-slurry. Again, the obtained slurry was subjected to centrifugal filtration and re-slurry. The process of the centrifugal filtration and the re-slurry was repeated several times. The finally obtained slurry was subjected to vacuum filtration using a membrane filter (hereinafter referred to as a “washing and filtration step”). The filtration cake was dried at 40° C. for 18 hours to reduce the volatile component to 0.5% by mass or less, to thereby obtain composite resin particles (C-1).

To 100 parts by mass of the composite resin particles (C-1), 1.0 part by mass of colloidal silica (AEROSIL R972, obtained from NIPPON AEROSIL CO., LTD.) as an external additive was added, followed by mixing by means of Sample Mill, to thereby obtain a toner (T-1) after the external additive treatment.

Example 2

<Production of Toner (T-2)>

An aqueous dispersion liquid of composite resin particles (C-2), where particles including resin particles (A-2) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 7.5 parts by mass of the particle dispersion liquid (W-1) and 7.5 parts by mass of the particle dispersion liquid (W0-1).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-2).

An external additive treatment was performed in the same manner as in Example 1, to obtain a toner (T-2).

Example 3

<Production of Toner (T-3)>

An aqueous dispersion liquid of composite resin particles (C-3), where particles including resin particles (A-3) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 10 parts by mass of the particle dispersion liquid (W-1) and 5 parts by mass of the particle dispersion liquid (W0-1).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-3).

An external additive treatment was performed in the same manner as in Example 1, to obtain a toner (T-3).

Example 4

<Production of Toner (T-4)>

An aqueous dispersion liquid of composite resin particles (C-4), where particles including resin particles (A-4) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 5 parts by mass of the particle dispersion liquid (W-2) and 10 parts by mass of the particle dispersion liquid (W0-2).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-4).

An external additive treatment was performed in the same manner as in Example 1, to obtain a toner (T-4).

Example 5

<Production of Toner (T-5)>

An aqueous dispersion liquid of composite resin particles (C-5), where particles including resin particles (A-5) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 7.5 parts by mass of the particle dispersion liquid (W-2) and 7.5 parts by mass of the particle dispersion liquid (W0-2).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-5).

An external additive treatment was performed in the same manner as in Example 1, to obtain a toner (T-5).

Example 6

<Production of Toner (T-6)>

An aqueous dispersion liquid of composite resin particles (C-6), where particles including resin particles (A-6) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 10 parts by mass of the particle dispersion liquid (W-2) and 5 parts by mass of the particle dispersion liquid (W0-2).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-6).

An external additive treatment was performed in the same manner as in Example 1, to obtain a toner (T-6).

Example 7

<Production of Toner (T-7)>

An aqueous dispersion liquid of composite resin particles (C-7), where particles including resin particles (A-7) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 5 parts by mass of the particle dispersion liquid (W-3) and 10 parts by mass of the particle dispersion liquid (W0-3).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-7).

An external additive treatment was performed in the same manner as in Example 1, to obtain a toner (T-7).

Example 8

<Production of Toner (T-8)>

An aqueous dispersion liquid of composite resin particles (C-8), where particles including resin particles (A-8) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 7.5 parts by mass of the particle dispersion liquid (W-3) and 7.5 parts by mass of the particle dispersion liquid (W0-3).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-8).

An external additive treatment was performed in the same manner as in Example 1, to obtain a toner (T-8).

Example 9

<Production of Toner (T-9)>

An aqueous dispersion liquid of composite resin particles (C-9), where particles including resin particles (A-9) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 10 parts by mass of the particle dispersion liquid (W-3) and 5 parts by mass of the particle dispersion liquid (W0-3).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-9).

An external additive treatment was performed in the same manner as in Example 1, to obtain a toner (T-9).

Example 10

<Production of Toner (T-10)>

An aqueous dispersion liquid of composite resin particles (C-10), where particles including resin particles (A-10) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of the particle dispersion liquid (W-1).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-10).

An external additive treatment was performed in the same manner as in Example 1, to obtain a toner (T-10).

Example 11

<Production of Toner (T-11)>

An aqueous dispersion liquid of composite resin particles (C-11), where particles including resin particles (A-11) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 3.75 parts by mass of the particle dispersion liquid (W-3) and 11.25 parts by mass of the particle dispersion liquid (W0-3).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C-11).

An external additive treatment was performed in the same manner as in Example 1, to obtain a toner (T-11).

Comparative Example 1

<Production of Toner (T'-1)>

An aqueous dispersion liquid of composite resin particles (C'-1), where particles including resin particles (A'-1) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of the particle dispersion liquid (W0-2).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C'-1).

An external additive treatment was performed in the same manner as in Example 1, to obtain a toner (T'-1).

Comparative Example 2

<Production of Toner (T'-2)>

An aqueous dispersion liquid of composite resin particles (C'-2), where particles including resin particles (A'-2) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of the particle dispersion liquid (W0-2).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C'-2).

An external additive treatment was performed in the same manner as in Example 1, to obtain a toner (T'-2).

Comparative Example 3

<Production of Toner (T'-3)>

An aqueous dispersion liquid of composite resin particles (C'-3), where particles including resin particles (A'-3) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 3 parts by mass of the particle dispersion liquid (W-1) and 12 parts by mass of the particle dispersion liquid (W0-1).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C'-3).

An external additive treatment was performed in the same manner as in Example 1, to obtain a toner (T'-3).

Comparative Example 4

<Production of Toner (T'-4)>

An aqueous dispersion liquid of composite resin particles (C'-4), where particles including resin particles (A'-4) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 2.5 parts by mass of the particle dispersion liquid (W-3) and 12.5 parts by mass of the particle dispersion liquid (W0-3).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C'-4).

An external additive treatment was performed in the same manner as in Example 1, to obtain a toner (T'-4).

Comparative Example 5

<Production of Toner (T'-5)>

An aqueous dispersion liquid of composite resin particles (C'-5), where particles including resin particles (A'-5) were deposited on the resin particles (B'-1), was obtained in the same manner as in Example 1 except that 15 parts by mass of the mixed solution of 5 parts by mass of the particle dispersion liquid (W-1) and 10 parts by mass of the particle dispersion liquid (W0-1) was replaced with 15 parts by mass of a mixed solution of 3.75 parts by mass of the particle dispersion liquid (W-1) and 11.25 parts by mass of the particle dispersion liquid (W0-1).

The obtained aqueous dispersion liquid was subjected to a washing and filtration step in the same manner as in Example 1. The obtained filtration cake was dried at 40° C. for 18 hours to reduce the volatile component to 0.5% by mass or less to thereby obtain composite resin particles (C'-5)

An external additive treatment was performed in the same manner as in Example 1, to obtain a toner (T'-5).

<Production of Carrier>

To 100 parts by mass of toluene, 100 parts by mass of a silicone resin (organostraight silicone), 5 parts by mass of γ-(2-aminoethyl)aminopropyltrimethoxysilane, and 10 parts by mass of carbon black were added. The resultant mixture was dispersed for 20 minutes by a HOMOMIXER, to prepare a resin layer coating liquid.

The resin layer coating liquid was applied onto surfaces of particles of spherical magnetite (1,000 parts by mass) having a volume average particle diameter of 50 μm, to produce [carrier].

<Production of Developer>

By means of a ball mill, 5 parts by mass of each [toner] and 95 parts by mass of the [carrier] were mixed to produce each [developer].

Next, Tg1st of each toner, Tga1st of a THF-insoluble component of each toner, and Tg2nd of a THE-soluble component of each toner were measured in the following manner. The results are presented in Tables 3 to 6.

<Measurements of Tg1st of Toner, Tga1st of THF-Insoluble Component, and Tg2nd of THF-Soluble Component>

The toner (1 g) was added to 100 mL of THE, and Soxhlet extraction was performed to separate a THF-soluble component and a THF-insoluble component. The THF-soluble component and the THF-insoluble component were each dried in a vacuum drier for 24 hours to obtain a polyester resin component C from the THF-soluble component, and a mixture of a polyester resin component A and a polyester resin component B from the THF-insoluble component. The obtained polyester resin component C and mixture were used as measuring samples. The toner was used as a measuring sample for measurement of Tg1st of the toner and Tg2nd of the toner.

Next, 5.0 mg of the measuring sample was added to a sample container formed of aluminium. The sample container was placed on a holder unit. The sample container on the holder unit was set in an electric furnace. The toner was heated from −80° C. to 150° C. at a heating rate of 1.0° C./min in a nitrogen atmosphere (first heating). After the first heating, the toner was cooled from 150° C. to −80° C. at a cooling rate of 1.0° C./min, followed by heating again to 150° C. at a heating rate of 1.0° C./min (second heating). DSC curves in the first heating and the second heating were measured by means of a differential scanning calorimeter ("Q-200", obtained from TA INSTRUMENTS JAPAN INC.).

A DSC curve in the first heating was selected from the obtained DSC curves using an analysis program stored in the Q-200 system, and glass transition temperature Tg1st of the measuring sample in the first heating was determined. Similarly, a DSC curve in the second heating was selected, and glass transition temperature Tg2nd of the measuring sample in the second heating was determined.

A DSC curve in the first heating was selected from the obtained DSC curves using the analysis program stored in the Q-200 system, and an endothermic peak top temperature of the measuring sample in the first heating was determined as a melting point. Similarly, a DSC curve in the second heating was selected, and an endothermic peak top temperature of the measuring sample in the second heating was determined as a melting point.

As for the melting points and glass transition temperatures Tg of the polyester resin components A, B, and C and other constitutional units, such as the release agent, the endothermic peak top temperature and the glass transition temperature Tg2nd in the second heating are respectively determined as a melting point and glass transition temperature Tg of each measuring sample.

The THF-insoluble component of the toner was heated from −80° C. to 150° C. at a heating rate of 1.0° C./min while applying a modulation temperature amplitude of ±1.0° C./min using the modulation mode (first heating). Based on the obtained DSC curve, a DSC curve was obtained by plotting a reversing heat flow on a vertical axis of a graph using the analysis program stored in the Q-200 system, and the onset value was determined as Tg. In this manner, Tga1st, Tgb1st, and Tg2nd' were determined.

Next, the external additives were removed as much as possible from each of the obtained toners by a separation treatment using ultrasonic waves in the following manner to turn the toner to the state close to the toner base particles. The average distance between the resin particles next to each other and the standard deviation thereof were determined. The results are presented in Tables 3 to 6.

<Measurement of Distance Between Particles>

—Method for Separating External Additives—

[1] A 100 mL screw tube was charged with 50 mL of a 5% by mass surfactant aqueous solution (product name: NOIGEN ET-165, obtained from DKS Co., Ltd.) and 3 g of the toner was added to the aqueous solution, followed by gently moving the solution in up-down and left-right motions. The resultant solution was stirred for 30 minutes in a ball mill to allow the toner to conform to the dispersion solution.

[2] Ultrasonic energy was applied to the dispersion solution by means of an ultrasonic homogenizer (product name: Homogenizer, model: VCX750, CV33, obtained from SONICS & MATERIALS, INC.) for 60 minutes, with the output set to 40 W.

—Ultrasonic Wave Conditions—

Oscillation time: continuous 60 minutes

Amplitude: 40 W

Oscillation onset temperature: 23±1.5° C.

Temperature during oscillation: 23±1.5° C.

[3] (1) The resultant dispersion liquid was subjected to vacuum filtration with filter paper (product name: Qualitative filter paper (No. 2, 110 mm), obtained from Toyo Roshi Kaisha, Ltd.), and the obtained filtration cake was washed twice with ion-exchanged water, followed by filtering off the separated external additives. Then, the obtained toner particles were dried.

(2) The toner obtained in (1) was observed under a scanning electron microscope (SEM). First, a backscattered electron image was observed to detect the external additives or filler including Si.

(3) The image of (2) was binarized using image processing software (Image J) to eliminate the external additives and filler.

Next, a secondary electron image of the toner was observed at the same position as in the (2). The resin particles were not observed in the backscattered electron image, but only in the secondary electron image. The obtained secondary electron image was compared to the image obtained in the (3), and the particles present in the area other than the external additives and filler (the area other than the area eliminated in the (3)) were determined as resin particles. The distance between the resin particles (the distance between the center of one particle to the center of another particle present next to the one particle) was measured using the image processing software.

The above measurement was performed on 100 binarized images (one toner particle per image) and the average value of the measured values was determined as the average distance between the resin particles next to each other.

The standard deviation of the distance between the resin particles was calculated according to the following mathematical expression where the distance between the resin particles was x.

$$\sqrt{\frac{1}{n-1}\sum_{k=1}^{n}(x_i-\bar{x})}$$

[Imaging Conditions]

Scanning electron microscope: SU-8230 (obtained from Hitachi High-Tech Corporation)

Image magnification: 35,000 times

Images: secondary electron (SE) (L), backscattered electron (BSE)

Acceleration voltage: 2.0 kV

Acceleration current: 1.0 μA

Probe current: Normal

Focus mode: UHR

WD: 8.0 mm

Next, Toners (T-1) to (T-11) and (T'-1) to (T'-4), and the developers were evaluated for "low temperature fixing ability," "heat resistant storage stability," "cleanability," and "filming resistance by additives." The results are presented in Tables 3 to 6.

<Low Temperature Fixing Ability>

Each toner was uniformly deposited on the paper surface at 0.8 mg/cm$^2$. As a method for depositing the toner on the paper surface, a printer from which a thermal fixing device had been removed was used.

Another method may be used as long as the toner can be uniformly deposited at the above weight density. A cold offset onset temperature (minimum fixing temperature, MFT) was measured when the paper was allowed to pass through a press roller under the conditions that the fixing speed (peripheral speed of a heat roller) was 213 mm/sec and the fixing pressure (pressure of the press roller) was 10 kg/cm$^2$. The lower cold offset onset temperature means more excellent low temperature fixing ability.

[Cold Offset Evaluation Criteria]

A: The minimum fixing temperature was 130° C. or lower.

B: The minimum fixing temperature was higher than 130° C. but 135° C. or lower.

C: The minimum fixing temperature was higher than 135° C. but 140° C. or lower.

D: The minimum fixing temperature was higher than 140° C.

<Heat Resistant Storage Stability>

After storing each toner at 50° C. for 8 hours, the toner was sieved for 2 minutes with a wire mesh with 42-mesh as the opening size, and the residual rate of the toner on the wire mesh was measured. The result was evaluated according to the following criteria. The smaller residual rate means more excellent heat resistant storage stability of the toner.

[Evaluation Criteria]

A: The residual rate was less than 5%.

B: The residual rate was 5% or greater but less than 15%.

C: The residual rate was 15% or greater but less than 30%.

D: The residual rate was 30% or greater.

<Cleanability (Contamination of Photoconductor)>

A chart having an image ratio of 5% was output on 50,000 sheets (A4 size, landscape) by means of an image forming apparatus (IMAGIO MP C5002, obtained from Ricoh Company, Limited) in a laboratory environment of 21° C. and 65% RH in the following manner.

A 3-band chart having a longitudinal band pattern (relative to the paper feeding direction) having a band width of 43 mm was output as an evaluation image on 100 sheets (A4 size, landscape) in the laboratory environment of 32° C. and 54% RH. The obtained images were visually observed, and cleanability was evaluated from the presence or absence of image defects due to cleaning failures based on the following criteria.

[Evaluation Criteria]

A: The toner that had passed through a cleaning blade due to cleaning failure was not visually observed on the printing paper sheet and the photoconductor, and the trace of the toner that had passed through, which could appear as lines on the photoconductor along the longitudinal direction, could not be observed even under a microscope.

B: The toner that had passed through a cleaning blade due to cleaning failure was not visually observed on the printing paper sheet and the photoconductor.

D: The toner that had passed through a cleaning blade due to cleaning failure was visually observed both on the printing paper sheet and the photoconductor.

<Filming Resistance by Additives (Inorganic Particles)>

A longitudinal band chart having an image area of 30% was output on 5,000 sheets (A4 size, landscape) at 3 prints/job by means of an image forming apparatus (IMAGIO MP C5002, obtained from Ricoh Company, Limited) in a laboratory environment of 27° C. and 90% RH. Subsequently, a blank image was output at 3 prints/job on 5,000 sheets (A4 size, landscape), followed by outputting a halftone image on one sheet. The photoconductor was visually observed, and the filming resistance by the additives was evaluated based on the following criteria.

[Evaluation Criteria]

A: There was neither problem in the photoconductor nor problem in quality.

B: Very slight filming was observed along the printing direction, but there was no problem because the filming did not cause any problem in quality of the output images.

D: The filming was clearly observed on the photoconductor, which caused a problem in the image quality.

<Comprehensive Judgment>

The comprehensive judgment was made on the evaluation results of the above four evaluation items; i.e., "low temperature fixing ability", "heat resistant storage stability", "cleanability", and "filming resistance by additives" based on the following criteria.

[Evaluation Criteria]

Good: There were one or more As and there was neither C nor D.

Fair: There was neither C nor D.

Poor: There was C or D.

TABLE 3

| | | Ex. 1 | Ex. 2 | Ex. 3 | Ex. 4 | Ex. 5 |
|---|---|---|---|---|---|---|
| Structure of toner | | core-shell structure | core-shell structure | core-shell structure | core-shell structure | core-shell structure |
| Toner for use | | T-1 | T-2 | T-3 | T-4 | T-5 |
| Constitutional component of resin particles | | styrene-acrylic resin | styrene-acrylic resin | styrene-acrylic resin | styrene-acrylic resin | styrene-acrylic resin |
| Resin particles A for use | | A-1 | A-1 | A-1 | A-2 | A-2 |
| Particle diameter of resin particles A [nm] | | 17.2 | 17.2 | 17.2 | 34.3 | 34.3 |
| Resin particles B for use | | B-1 | B-1 | B-1 | B-2 | B-2 |
| Particle diameter of resin particles B [nm] | | 15 | 15 | 15 | 30 | 30 |
| Resin a2/resin a1 ratio (within resin particle A) | | 1/2 | 1/2 | 1/2 | 1/2 | 1/2 |
| Blending ratio (resin particles A/resin particles B) | | 1/2 | 1/1 | 2/1 | 1/2 | 1/1 |
| Average distance between resin particles [nm] | | 120 | 52 | 29 | 230 | 142 |
| Standard deviation of the distance between resin particles [nm] | | 63 | 23 | 15 | 200 | 45 |
| Tg1st of toner [° C.] | | 42 | 43 | 45 | 43 | 44 |
| Tg1st of THF-insoluble component of toner [° C.] | | −37 | −37 | −37 | −37 | −37 |
| Tg2nd of THF-soluble component of toner [° C.] | | 57 | 57 | 57 | 57 | 57 |
| Presence of washing step | | present | present | present | present | present |
| Evaluation results | Low temperature fixing ability | A | A | A | A | B |
| | Heat resistant storage stability | B | B | D | B | B |
| | Cleanability | B | B | B | B | B |
| | Filming resistance by additives | A | B | B | A | B |
| | Comprehensive judgment | Good | Good | Good | Good | Fair |

TABLE 4

| | | Ex. 6 | Ex. 7 | Ex. 8 | Ex. 9 | Ex. 10 |
|---|---|---|---|---|---|---|
| Structure of toner | | core-shell structure | core-shell structure | core-shell structure | core-shell structure | core-shell structure |
| Toner for use | | T-6 | T-7 | T-8 | T-9 | T-10 |
| Constitutional component of resin particles | | styrene-acrylic resin | styrene-acrylic resin | styrene-acrylic resin | styrene-acrylic resin | styrene-acrylic resin |
| Resin particles A for use | | A-2 | A-3 | A-3 | A-3 | A-1 |
| Particle diameter of resin particles A [nm] | | 34.3 | 51.5 | 51.5 | 51.5 | 17.2 |
| Resin particles B for use | | B-2 | B-3 | B-3 | B-3 | — |
| Particle diameter of resin particles B [nm] | | 30 | 45 | 45 | 45 | — |
| Resin a2/resin a1 ratio (within resin particle A) | | 1/2 | 1/2 | 1/2 | 1/2 | 1/2 |
| Blending ratio (resin particles A/resin particles B) | | 2/1 | 1/2 | 1/1 | 2/1 | 1/0 |
| Average distance between resin particles [nm] | | 55 | 450 | 240 | 150 | 30 |
| Standard deviation of the distance between resin particles [nm] | | 35 | 330 | 210 | 94 | 13 |
| Tg1st of toner [° C.] | | 46 | 44 | 45 | 47 | 46 |
| Tg1st of THF-insoluble component of toner [° C.] | | −37 | −37 | −37 | −37 | −37 |
| Tg2nd of THF-soluble component of toner [° C.] | | 57 | 57 | 57 | 57 | 57 |
| Evaluation results | Presence of washing step | present | present | present | present | present |
| | Low temperature fixing ability | B | A | B | B | A |
| | Heat resistant storage stability | B | B | A | A | A |
| | Cleanability | B | B | A | A | B |
| | Filming resistance by additives | B | B | B | B | B |
| | Comprehensive judgment | Fair | Good | Good | Good | Good |

TABLE 5

| | Ex. 11 |
|---|---|
| Structure of toner | core-shell structure |
| Toner for use | T-11 |
| Constitutional component of resin particles | styrene-acrylic resin |
| Resin particles A for use | A-3 |
| Particle diameter of resin particles A [nm] | 51.5 |
| Resin particles B for use | B-3 |
| Particle diameter of resin particles B [nm] | 45 |
| Resin a2/resin a1 ratio (within resin particle A) | ½ |
| Blending ratio (resin particles A/resin particles B) | ⅓ |
| Average distance between resin particles [nm] | 460 |
| Standard deviation of the distance between resin particles [nm] | 495 |
| Tg1st of toner [° C.] | 44 |
| Tg1st of THF-insoluble component of toner [° C.] | −37 |
| Tg2nd of THF-soluble component of toner [° C.] | 57 |
| Presence of washing step | present |
| Evaluation results | |
| Low temperature fixing ability | B |
| Heat resistant storage stability | B |
| Cleanability | B |
| Filming resistance by additives | B |
| Comprehensive judgment | Fair |

TABLE 6

| | Comp. Ex. 1 | Comp. Ex. 2 | Comp. Ex. 3 | Comp. Ex. 4 | Comp. Ex. 5 |
|---|---|---|---|---|---|
| Structure of toner | single layer | single layer | core-shell structure | core-shell structure | core-shell structure |
| Toner for use | T'-1 | T'-2 | T'-3 | T'-4 | T'-5 |
| Constitutional component of resin particles | styrene-acrylic resin | styrene-acrylic resin | styrene-acrylic resin | styrene-acrylic resin | styrene-acrylic resin |
| Resin particles A for use | — | — | A-1 | A-3 | A-1 |
| Particle diameter of resin particles A [nm] | — | — | 17.2 | 51.5 | 17.2 |
| Resin particles B for use | B-2 | B-2 | B-1 | B-3 | B-1 |
| Particle diameter of resin particles B [nm] | 30 | 30 | 15 | 45 | 15 |
| Resin a2/resin a1 ratio (within resin particle A) | — | — | 1/2 | 1/2 | 1/2 |
| Blending ratio (resin particles A/resin particles B) | 0/1 | 0/1 | 1/4 | 1/5 | 1/3 |
| Average distance between resin particles [nm] | — | — | 600 | 520 | 530 |
| Standard deviation of the distance between resin particles [nm] | — | — | 560 | 530 | 500 |

TABLE 6-continued

| | | Comp. Ex. 1 | Comp. Ex. 2 | Comp. Ex. 3 | Comp. Ex. 4 | Comp. Ex. 5 |
|---|---|---|---|---|---|---|
| Tg1st of toner [° C.] | | 40 | 48 | 41 | 42 | 42 |
| Tg1st of THF-insoluble component of toner [° C.] | | −37 | −37 | −37 | −37 | −37 |
| Tg2nd of THF-soluble component of toner [° C.] | | 57 | 57 | 57 | 57 | 57 |
| Presence of washing step | | present | absent | present | present | present |
| Evaluation results | Low temperature fixing ability | B | D | B | B | B |
| | Heat resistant storage stability | D | B | C | C | B |
| | Cleanability | D | B | D | D | D |
| | Filming resistance by additives | B | D | D | D | D |
| | Comprehensive judgment | Poor | Poor | Poor | Poor | Poor |

It was found from the results in Tables 3 to 6 that Examples 1 to 11 had more excellent performance in any one of “low temperature fixing ability,” “heat resistant storage stability,” “cleanability,” “filming resistance by additives,” and “comprehensive judgment” compared with Comparative Examples 1 to 5.

The toner (T'-1) of Comparative Example 1 using the composite resin particles (A'-1) including only the resin particles (B-2) had satisfactory low temperature fixing ability and filming resistance by external additives, but cleanability and heat resistant storage stability were poor.

The toner (T'-2) of Comparative Example 2 using composite resin particles (A'-2) obtained by omitting the washing step performed on the composite resin particles (A'-1) including only the resin particles (B-2) had satisfactory heat resistant storage stability and cleanability, but low temperature fixing ability and filming resistance by external additives were poor.

The toner (T'-3) of Comparative Example 3 using the composite resin particles (A'-3), in which the ratio of the resin particles (A-1) was reduced, and the toner (T'-4) of Comparative Example 4 using the composite resin particles (A'-4), in which the ratio of the resin particles (A-3) was reduced, had satisfactory low temperature fixing ability, but heat resistant storage stability, cleanability, and filming resistance by additives were poor.

Embodiments of the present disclosure are as follows, for example.

<1> A toner including:
toner base particles each including a binder resin, a colorant, and wax; and
resin particles on surfaces of the toner base particles,
wherein a standard deviation of a distance between the resin particles next to each other on the surfaces of the toner base particles is less than 500 nm.

<2> The toner according to <1>, wherein the standard deviation of the distance between the resin particles next to each other on the surfaces of the toner base particles is 250 nm or less.

<3> The toner according to <1> or <2>, wherein an average value of the distance between the resin particles next to each other on the surfaces of the toner base particles is 10 nm or greater but 500 nm or less.

<4> The toner according to any one of <1> to <3>, wherein each of the resin particles includes a core resin and a shell resin covering at least part of a surface of the core resin.

<5> The toner according to <4>, wherein the shell resin includes a styrene-acrylic resin.

<6> The toner according to any one of <1> to <5>, wherein an amount of the resin particles is from 0.2% by mass through 5% by mass relative to the toner.

<7> The toner according to any one of <1> to <6>, wherein a glass transition temperature (Tg1st) of the toner in first heating as measured by differential scanning calorimetry (DSC) is from 40° C. through 65° C.,
a glass transition temperature (Tg1st) of tetrahydrofuran (THF)-insoluble component of the toner in the first heating as measured by DSC is from −45° C. through 5° C., and
a glass transition temperature (Tg2nd) of a THF-soluble component of the toner in second heating is from 20° C. through 65° C.

<8> The toner according to any one of <1> to <7>, wherein a glass transition temperature (Tg1st) of the toner in first heating as measured by differential scanning calorimetry (DSC) and a glass transition temperature (Tg2nd) of the toner in second heating as measured by DSC satisfy a relationship represented by:

$$Tg1st - Tg2nd \geq 10 [° C.]$$

<9> The toner according to any one of <1> to <8>, wherein the binder resin includes amorphous polyester.

<10> The toner according to any one of <1> to <9>, wherein the binder resin includes modified polyester.

<11> The toner according to <10>, wherein the modified polyester includes, as a constitutional unit, trivalent or tetravalent aliphatic polyvalent alcohol having from 3 through 10 carbon atoms.

<12> The toner according to <10> or <11>, wherein the modified polyester includes diol as a constitutional unit, and
the diol includes a main chain having an odd number of carbon atoms, which is from 3 through 9, and an alkyl group as a side chain.

<13> The toner according to any one of <10> to <12>, wherein the modified polyester includes a urethane bond, or a urea bond, or both a urethane bond and a urea bond.

<14> The toner according to any one of <1> to <13>, wherein the binder resin includes crystalline polyester.

<15> A developer including:
the toner according to any one of <1> to <14>; and
a carrier.

<16> A toner stored unit including:
a container; and
the toner according to any one of <1> to <14>, stored in the container.

<17> An image forming apparatus including
the toner stored unit according to <16>.

<18> An image forming method including:
forming an electrostatic latent image on an electrostatic latent image bearer;

developing the electrostatic latent image formed on the electrostatic latent image bearer with the toner according to any one of <1> to <14> to form a toner image;

transferring the toner image formed on the electrostatic latent image bearer to a medium; and fixing the toner image transferred on the medium.

<19> A method for producing the toner according to any one of <1> to <14>, the method including:

depositing resin particles on surfaces of toner base particles to form composite particles; and removing at least part of the resin particles from the composite particles.

<20> The method according to <19>, wherein the removing is washing the composite particles with a basic aqueous solution.

The toner according to any one of <1> to <14>, the developer according to <15>, the toner stored unit according to <16>, the image forming apparatus according to <17>, the image forming method according to <18>, and the method for producing a toner according to <19> or <20> can solve the above-described various problems existing in the art, and can achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A toner comprising:

toner base particles each comprising a binder resin, a colorant, and wax; and resin particles on surfaces of the toner base particles, wherein a standard deviation of a distance between the resin particles next to each other on the surfaces of the toner base particles is less than 500 nm;

wherein a glass transition temperature of a tetrahydrofuran (THF)-insoluble component of the toner in a first heating as measured by DSC is from −45° C. through 5° C.; and wherein the resin particles comprise a copolymer of styrene, butyl acrylate, methacrylic acid, and polyoxyethylene-1-(allyloxymethyl)alkyl ether ammonium sulfate.

2. The toner according to claim 1, wherein the standard deviation of the distance between the resin particles next to each other on the surfaces of the toner base particles is 250 nm or less.

3. The toner according to claim 1, wherein an average value of the distance between the resin particles next to each other on the surfaces of the toner base particles is 10 nm or greater but 500 nm or less.

4. The toner according to claim 1, wherein each of the resin particles comprises a core resin and a shell resin covering at least part of a surface of the core resin.

5. The toner according to claim 4, wherein the shell resin comprises a styrene-acrylic resin.

6. A toner stored unit comprising:

a container; and the toner according to claim 1, stored in the container.

7. An image forming apparatus comprising the toner stored unit according to claim 6.

8. An image forming method comprising:

forming an electrostatic latent image on an electrostatic latent image bearer;

developing the electrostatic latent image formed on the electrostatic latent image bearer with the toner according to claim 1 to form a toner image;

transferring the toner image formed on the electrostatic latent image bearer to a medium; and fixing the toner image transferred on the medium.

9. A method for producing the toner according to claim 1, the method comprising:

depositing resin particles on surfaces of toner base particles to form composite particles; and removing at least part of the resin particles from the composite particles.

10. The method according to claim 9, wherein the removing comprises washing the composite particles with a basic aqueous solution.

11. The toner according to claim 1, further comprising silica as an external additive.

12. The toner according to claim 1, wherein a volume average primary particle diameter of the resin particles is 100 nm or less.

13. The toner according to claim 1, wherein a volume average primary particle diameter of the resin particles is 5 nm or greater but 100 nm or less.

14. The toner according to claim 1, wherein a glass transition temperature (Tg2nd) of a THF-soluble component of the toner in a second heating is from 20° C. through 65° C.

15. The toner according to claim 1, wherein a mass ratio between a resin (b1) and a resin (b2) in the resin particles is from 5/95 to 95/5.

16. The toner according to claim 1, wherein the standard deviation of the distance between the resin particles next to each other on the surfaces of the toner base particles is 10 nm or greater and 250 nm or less.

17. The toner according to claim 1, wherein the standard deviation of the distance between the resin particles next to each other on the surfaces of the toner base particles is 10 nm or greater and 100 nm or less.

* * * * *